United States Patent
Xie et al.

(10) Patent No.: US 6,850,364 B2
(45) Date of Patent: Feb. 1, 2005

(54) METHOD AND APPARATUS FOR AN OPTICAL MULTIPLEXER AND DEMULTIPLEXER WITH AN OPTICAL PROCESSING LOOP

(75) Inventors: Ping Xie, Cupertino, CA (US); R. Brad Bettman, Mountain View, CA (US); Haisheng Rong, San Jose, CA (US); Kevin Zhang, Santa Clara, CA (US); Yalan Mao, Cupertino, CA (US); Wei Wang, San Jose, CA (US); Simon Yuanxiang Wu, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 33 days.

(21) Appl. No.: 10/170,055

(22) Filed: Jun. 12, 2002

(65) Prior Publication Data

US 2003/0231391 A1 Dec. 18, 2003

(51) Int. Cl.⁷ .................................................. G02B 5/30
(52) U.S. Cl. ...................... 359/497; 359/124; 359/127; 359/483; 359/494; 359/495; 359/498
(58) Field of Search ................................ 359/124, 127, 359/483, 494, 495, 497, 498

(56) References Cited

U.S. PATENT DOCUMENTS

| | | | |
|---|---|---|---|
| 4,094,581 A | 6/1978 | Baldwin et al. | |
| 4,685,773 A | 8/1987 | Carlsen et al. | |
| 4,813,761 A | 3/1989 | Davis et al. | |
| 4,987,567 A | 1/1991 | Buhrer | |
| 5,596,661 A | 1/1997 | Henry et al. | |
| 5,606,439 A | 2/1997 | Wu | |
| 5,694,205 A | 12/1997 | Gualtieri et al. | |
| 5,694,233 A | 12/1997 | Wu et al. | |
| 5,867,291 A | 2/1999 | Wu et al. | |
| 6,005,697 A | 12/1999 | Wu et al. | |
| 6,040,932 A * | 3/2000 | Duck et al. | ............... 359/124 |
| 6,208,444 B1 | 3/2001 | Wong et al. | |
| 6,373,604 B1 | 4/2002 | Xie | |

* cited by examiner

*Primary Examiner*—Audrey Chang
*Assistant Examiner*—Craig Curtis
(74) *Attorney, Agent, or Firm*—Workman Nydegger

(57) ABSTRACT

An optical device that can be used in a range of telecommunications applications including optical multiplexers/demultiplexers and optical routers. The optical device includes an optical processing loop which allows multi-stage performance characteristics to be achieved with a single physical filtration stage. Optical processing on the first leg and second legs of the loop is asymmetrical thereby improving the integrity of the optical signals by effecting complementary chromatic dispersion on the first and second legs. In an embodiment of the invention the optical device includes a fundamental filter cell, a retro reflector and a splitter/combiner. The fundamental filter cell filters optical signals propagating on each of two legs of an optical loop which intersects the fundamental filter cell. The fundamental filter cell operates as a full waveplate to the odd set of channels and a half waveplate to the even set of channels on a selected one of the two legs and as a half waveplate to the odd set of channels and a full waveplate to the even set of channels on a remaining one of the two legs. The retro reflector optically couples with the fundamental filter cell to reflect the optical signals from one of the two legs to an other of the two legs to form the optical loop. The splitter/combiner optically couples between the fundamental filter cell and the retro reflector to split or combine the odd set of channels and the even set of channels depending on the propagation direction of the optical signals along the optical loop.

22 Claims, 9 Drawing Sheets

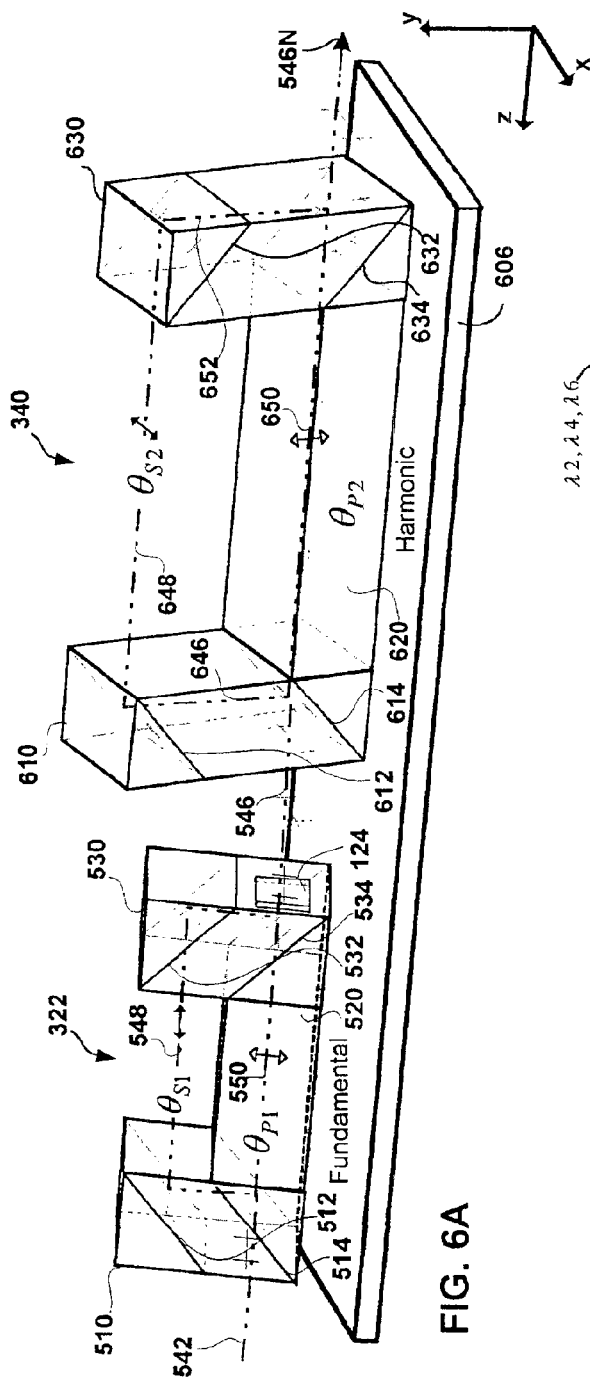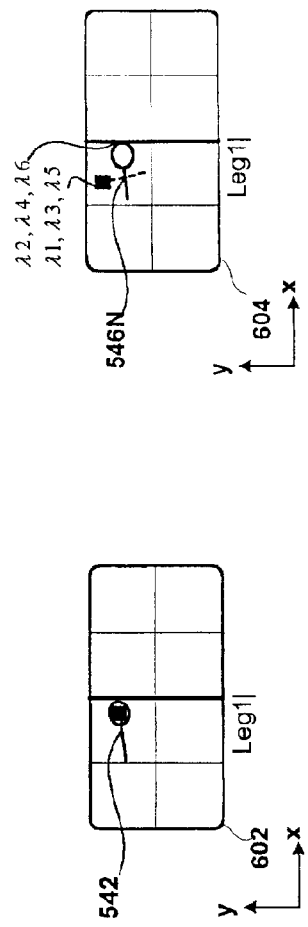
FIG. 6A
FIG. 6B
FIG. 6C

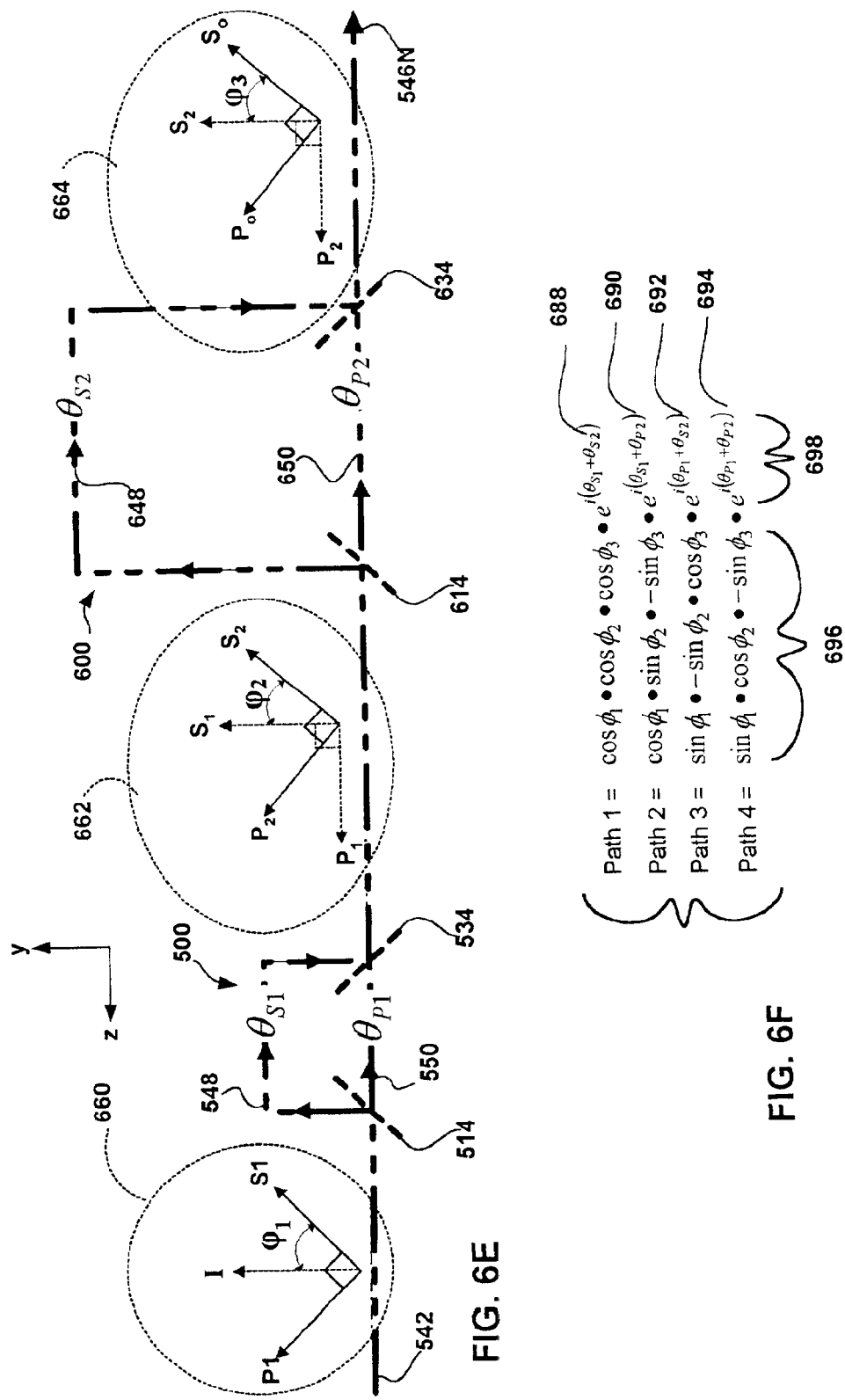

EVEN

ODD

METHOD AND APPARATUS FOR AN OPTICAL MULTIPLEXER AND DEMULTIPLEXER WITH AN OPTICAL PROCESSING LOOP

BACKGROUND

1. Field

The present disclosure generally relates to optical filters and more particularly to optical filters for optical fiber communication networks.

2. Description of the Related Art

The Synchronous Optical Network (SONET) standard defines a hierarchy of multiplexing levels and standard protocols which allow efficient use of the wide bandwidth of fiber optic cable, while providing a means to merge lower level DS0 and DS1 signals into a common medium. Currently optical communication is accomplished by what is known as "wavelength division multiplexing" (WDM), in which separate subscriber/data sessions may be handled concurrently on a single optic fiber by means of modulation of each of those subscriber data streams on different portions, a.k.a. channels, of the light spectrum.

The spacing between channels is constantly being reduced as the resolution and signal separation capabilities of multiplexers and de-multiplexers are improved. Current International Telecommunications Union (ITU) specifications call for channel separations of approximately 0.4 nm, i.e., 50 GigaHertz (GHz). At this channel separation as many as 128 channels may be supported in C-band alone. Each channel is modulated on a specific center frequency, within the range of 1525–1575 nm, with the center frequency of each channel provided by a corresponding one of 128 semiconductor lasers. The modulated information from each of the semiconductor lasers is combined (multiplexed) onto a single optic fiber for transmission. As the length of a fiber increases the signal strength decreases. To offset signal attenuation erbium doped fiber amplifiers (EDFAs) are used at selected locations along the communication path to boost signal strength for all the channels. At the receiving end the processes is reversed, with all the channels on a single fiber separated (demultiplexed), and demodulated optically and/or electrically.

Optical filters play important roles in handling these optical communications for the telecommunications industry. They perform wavelength multiplexing and demultiplexing of the 128 or more optical channels. They may also be used to gain scale EDFAs by flattening their gain profile.

The requirements for optical filters used for any of these applications are very demanding. The close spacing between the channels in a WDM, makes it desirable to design a WDM with flat pass bands in order to increase the error tolerance. This is primarily because the center wavelength of a transmitter slips with temperature. Further, the cascading of the WDM stages causes the pass bands to become narrower at each WDM down the chain. Therefore, the larger the pass bands the greater the shift tolerance of the channel.

Various devices, such as multi-stage band and comb splitters, have been proposed to fill these new demanding requirements and none are fully satisfactory. In a multi-stage band splitter, the first stage makes a coarse split of two wavelength ranges, and subsequent stages make finer and finer splits of sub-bands within each of the wavelength ranges. In a multi-stage comb splitter, the first de-multiplexing stage filters out two interlaced periodic sets of relatively narrow band passes and the subsequent stages employ wider band pass periodic filters until the individual channels are de-multiplexed. In either case, noise and inter-channel interference are limiting factors in the handling of increasingly narrow band pass requirements. Multi-layer thin-film filters can be used to construct optical filters in bulk optics, but they are undesirable because of an increase in the number of layers for narrow channel spacing, precision of manufacture and expense associated with increasingly narrow band pass requirements. Further, dispersion will become a major issue as channel spacing decreases. Especially at 50 GHz channel spacing, dispersion of thin film filter is so big that it can not be used for OC-192 signal (10 Gbit/sec). Mach-Zehnder interferometers have been widely employed, but they have a sinusoidal response, giving rise to strongly wavelength dependent transmission and a narrow rejection band. Other designs have encountered a variety of practical problems.

Accordingly, there is a need for new optical filters for optical multiplexing and/or demultiplexing and other optical applications.

SUMMARY

In general, an optical device is provided that can be used in a range of telecommunications applications including optical multiplexers/demultiplexers and optical routers. The optical device split and combines optical signals of frequency division multiplexed optical communication channels which are evenly spaced apart in frequency from one another. The optical device includes an optical processing loop which allows multi-stage performance characteristics to be achieved with a single physical filtration stage. Optical processing on the first leg and second legs of the loop is asymmetrical thereby improving the integrity of the optical signals by effecting complementary chromatic dispersion on the first and second legs. The single physical filtration stage includes a fundamental filter cell and may include one or more harmonic filters.

In one embodiment, the optical device for processing optical signals includes a fundamental filter cell, a retro reflector and a splitter/combiner. The fundamental filter cell filters optical signals propagating on each of two legs of an optical loop which intersects the fundamental filter cell. The fundamental filter cell operates as a full waveplate to the odd set of channels and a half waveplate to the even set of channels on a selected one of the two legs and as a half waveplate to the odd set of channels and a full waveplate to the even set of channels on a remaining one of the two legs. The retro reflector optically couples with the fundamental filter cell to reflect the optical signals from one of the two legs to an other of the two legs to form the optical loop. The splitter/combiner optically couples between the fundamental filter cell and the retro reflector to split or combine the odd set of channels and the even set of channels depending on the propagation direction of the optical signals along the optical loop.

In an alternate embodiment of the invention an optical device for processing optical signals between a first port communicating odd channels together with even channels and second and third ports communicating odd and even channels respectively is disclosed. The optical device includes: a fundamental filter cell, a retro reflector, and a splitter/combiner. The fundamental filter cell optically couples on a side to all of the ports. The fundamental filter cell exhibits a first and a second free spectral range (FSR) to optical signals propagating on an optical loop with a first leg coupled to the first port and a second leg coupled to the second and third ports. The first and second FSRs are offset with respect to one another to effect substantially complementary chromatic dispersions for each channel within the odd set of channels and the even set of channels. The retro reflector optically couples with the fundamental filter cell to reflect the optical signals from one of the legs to an other of the legs to form the optical loop. The splitter/combiner optically couples between the fundamental filter cell and the retro reflector to split or combine the odd set of channels and the even set of channels depending on the propagation direction of the optical signals along the optical loop.

In an alternate embodiment, a method for splitting and combining optical signals is disclosed. The method includes:

generating a first set of phase retardations corresponding with odd integer multiples of half a wavelength for each center wavelength associated with a selected one of the odd set of channels and the even set of channels and corresponding with integer multiples of a full wavelength for each center wavelength associated with a remaining one of the odd set of channels and the even set of channels;

splitting/combining the odd set of channels and the even set of channels depending on the propagation direction of the optical signals;

generating a second set of phase retardations of substantially half the wavelength for each center wavelength associated with both the odd and even channel sets; and repeating the first generating act to effect substantially complementary chromatic dispersions for each channel within the odd set of channels and the even set of channels.

In another embodiment, an associated means is disclosed.

Various advantages and other features will be readily apparent from the following detailed description, the accompanying drawings and the claims.

BRIEF DESCRIPTION OF THE DRAWINGS

These and other features and advantages of the present invention will become more apparent to those skilled in the art from the following detailed description in conjunction with the appended drawings in which:

FIG. 6A is an isometric view of a multi-cell implementation of the polarization beam splitting cell shown in FIG. 5A utilized in the embodiment of the optical mux/demux shown in FIG. 3A.

FIGS. 6B–C show polarization diagrams for opposing ends of the polarization beam splitting cells shown in FIG. 6A.

FIG. 6E is a side elevation view of the variable coupling between cells of the multi-cell implementation shown in FIG. 6A.

FIG. 6F shows the individual transforms associated with each of the four delay paths on one of the two optical processing legs through the two cell sequence shown in FIG. 6A.

DETAILED DESCRIPTION

An optical device is disclosed that can be used in a range of telecommunications applications including optical multiplexers/demultiplexers and optical routers. The optical device includes an optical processing loop which allows multi-stage performance characteristics to be achieved with a single physical filtration stage. Optical processing on the first leg and second legs of the loop is asymmetrical thereby improving the integrity of the optical signals by effecting complementary chromatic dispersion for each channel on the first and second legs.

Figure 1:
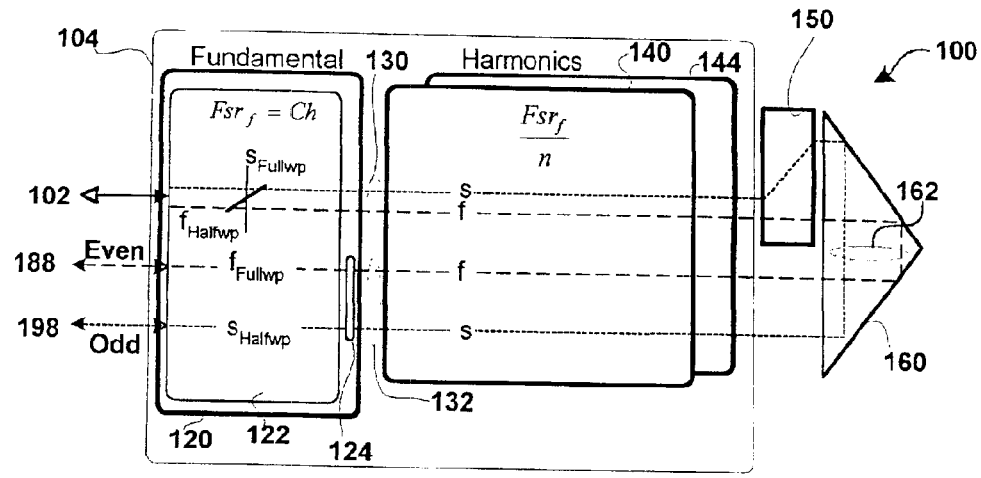
FIG. 1 is a hardware block diagram of an embodiment of the optical mux/demux with an optical processing loop formed by a single stage coupled to a splitter/combiner and retro reflector.

FIG. 1 is a hardware block diagram of an embodiment of the optical mux/demux 100 with an optical processing loop 130,162,132 formed by a single stage 104 optically coupled to a splitter/combiner 150 and retro reflector 160. The mux/demux is designed to operate on the narrowly spaced frequency division multiplexed channels of a telecommunications grid. These channels may be spaced apart in frequency at 50 GHz intervals or less. The mux/demux can depending on the propagation direction of an optical signal, split or combine an optical stream with 50 GHz channel spacing into two separate optical streams with odd and even 100 GHz channel spacing respectively and vice versa. The mux/demux separates/combines odd and even channel sets, with a higher degree of isolation and a lower dispersion than prior art designs. It may be used in combination with other stages of similar or different design to separate out each individual channel of a telecommunications or other communication grid.

In operation as an optical demultiplexer optical signals with both odd channels and even channels are injected into port 102 and are subject in stage 104 to a first stage of optical processing in leg 130 of the optical processing loop. The processed optical signals from leg 130 are split in splitter 150 into discrete optical signals with a corresponding one of an odd set of channels and an even set of channels and reflected by retro reflector 160 back to stage 104 for a second stage of optical processing in leg 132 of the optical processing loop. The resultant optical signals one with odd channels and the other with the even channels are output at the corresponding one of port 188, 198. Where the operations are reversed the optical device 100 operates as an optical multiplexer combining discrete optical signals one with odd channels and the other with even channels input at ports 188, 198 into a single optical signal with both odd and even channels output at port 102.

Stage 104 includes a fundamental filter cell 120 and may include additional harmonic filters 140, 144. The filters are in an embodiment of the invention, polarization filters which accept polarized optical signals and which split the input into orthogonal component vectors along a fast and a slow delay path. The optical pathlength difference between the fast and slow delay paths determines the periodic comb filter functions exhibited by the fundamental filter cell. The filters may be fabricated from a range of birefringent materials (See FIGS. 2AB) or from the elements of a polarization beam splitting cell (See FIGS. 3AB). The filters of stage 104 may be characterized with a Fourier series in which the fundamental filter cell provides fundamental comb filter functions and in which any additional harmonic filters impose higher order harmonics thereon.

The fundamental filter cell is designed with a first free spectral range (FSR) for optical signals propagating on the first leg 130 and a second FSR for optical signals propagating on the second leg 132 of the optical processing loop. The first and the second FSR are both substantially equal to the channel spacing between adjacent odd or even channels. The first and second FSR are also offset with respect to one another by an amount which effects phase shifts of odd integer multiples of substantially half a wavelength for each center wavelength associated with any of the channels, odd or even. This asymmetry improves the integrity of the optical signals by effecting complementary chromatic dispersion on the first and second legs.

The offset in FSR between the first and second legs of optical processing in the fundamental filter cell 120 is effected in the embodiment shown in FIG. 1 by a fundamental filter 122 optically coupled on one of the optical processing legs 126, 128 with a broadband half waveplate 124. In this embodiment of the invention the fundamental filter operates as a narrowband waveplate with an FSR on each of the legs which substantially corresponds with the spacing between adjacent odd or even channels. In this embodiment the fundamental filter operates as a narrowband full/half waveplate or half/full waveplate for the odd set of channels and the even set of channels. The broadband half waveplate may be a discrete component or integrated with the fundamental filter. As a discrete component the broadband half waveplate may be optically coupled with the fundamental filter on either side thereof. The broadband half waveplate optically couples to the fundamental filter on one of the two legs of the optical loop. The broadband half waveplate exhibiting a second FSR which effects phase retardations of odd integer multiples of substantially half a wavelength for each center wavelength associated with the channels, odd or even.

The first and the second FSR of the fundamental filter cell each substantially corresponds with the periodic frequency spacing between adjacent odd or even channels, e.g. an odd channel and an adjacent odd channel. The optical path length difference between the two delay paths in the fundamental filter cell on either the first or the second leg, corresponds inversely with the free spectral range (FSR). This relationship is set forth in the following Equation 1.

Figure 7B:
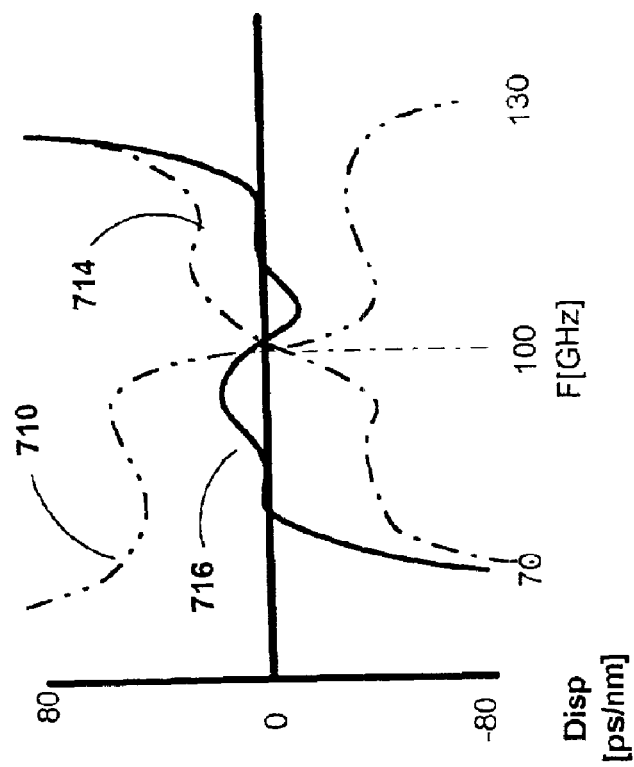
FIGS. 7A–B are graphs showing the complementary dispersions profiles about a representative center frequency of one of the channels.
Figure 7A:
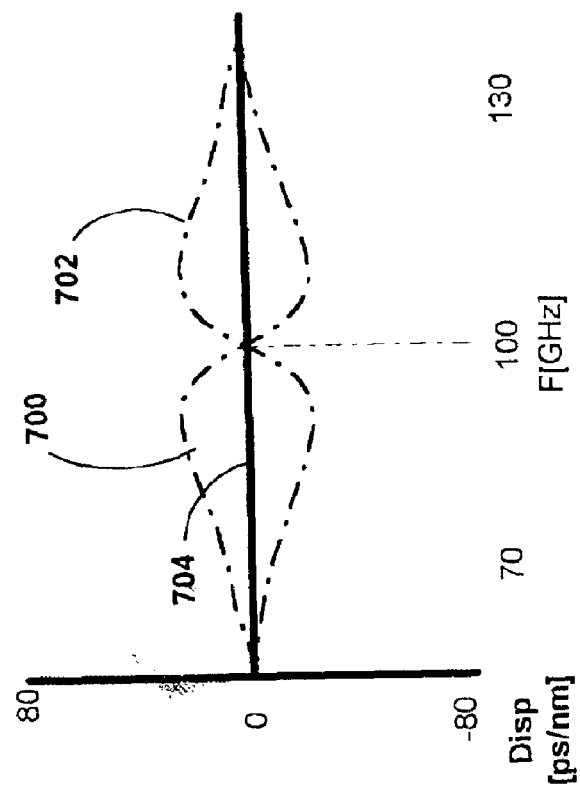

Equation 1:

$$FSR = \left(\frac{c}{|L_S - L_F|}\right)$$

where $L_S$ and $L_F$ are the total optical path length of each of the delay paths on either of the optical processing legs within the fundamental filter cell and "c" is the speed of light in a vacuum. Additional filters, e.g. 140, 144 may provide the harmonics, required for establishing a flat top composite comb filter function for the mux/demux such as that shown in FIG. 8E. The mux/demux shows improvements in chromatic dispersion over prior art designs as a result of an optical pathlength shift and inversely corresponding FSR offset on the first and second optical processing leg within the fundamental filter cell 120. In the embodiment of the invention shown in FIG. 1, the fundamental filter cell includes the broadband half-waveplate filter portion 124 on one of the optical processing legs 130, 132. This broadband half-waveplate filter imposes a half-wavelength phase retardation on both the odd and even channels. This broad-band half waveplate portion effects an optical pathlength difference in one of the optical processing legs with respect to the other within the fundamental filter cell. The optical pathlength difference corresponds with odd integer multiples of one-half of the wavelength of interest as shown in the following Equation 2:

Equation 2:

$$OPD_{L1} + (2N+1)\frac{\lambda}{2} = OPD_{L2}$$

where $OPD_{L1}$ is the optical pathlength difference of the fundamental cell along one of the optical processing legs 126, 128 and $OPD_{L2}$ is the optical pathlength difference of the fundamental cell(s) along the other of the optical processing legs 126, 128. This shift in optical pathlength difference and inversely corresponding offset in FSR on the two optical processing legs 126,128 results in substantially complementary chromatic dispersion profiles along each of the optical processing legs, the net effect of which is a substantial reduction of chromatic dispersion, i.e. within each communication channel and a concomitant improvement in signal integrity within each telecommunications channel as shown in FIGS. 7A–B. This shift is achieved with a negligible deviation, e.g. less than 0.3%, between the first and second FSR of the fundamental cell 110.

The FSR of the broadband half waveplate is expressed in the following Equation 3:

Equation 3:

$$FSR = \left(\frac{c}{|L_S - L_F|}\right) = \frac{v_c}{1/2 + m}$$

where $L_S$ and $L_F$ are the total optical path length on the fast and slow delay paths of the broadband half waveplate, $v_c$ is the center frequency of a selected one of the odd or even channels and "m" is the integer order of the wavelength. The range of acceptable values for the order "m" depends on the number of channels, the overall bandwidth, and the center frequency of the center channel. Smaller values of order "m" correspond with more uniform the behavior of the broadband half waveplate across all channels and smaller optical pathlengths. For a typical telecommunication application order "m" will be less than one-hundred and may be in the range of 1–10. For a channel spacing of 50 GHz the FSR of the broadband half waveplate at a center frequency of 1550 nm and an order of "0" would be 2*c[nm]/1550[nm] or approximately 386 THz which is at least two orders of magnitude greater then the FSR of the fundamental filter 122.

Figure 2A:
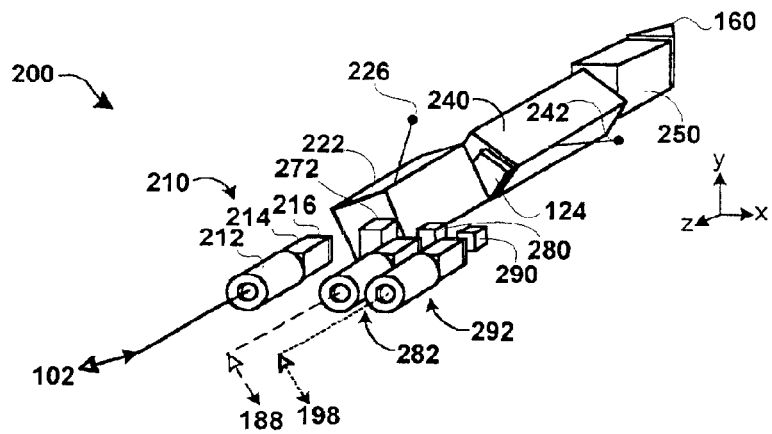
FIGS. 2A–B are isometric views of alternate embodiments of the optical mux/demux shown in FIG. 1 with birefringent crystals forming the single filter stage.
Figure 2B:
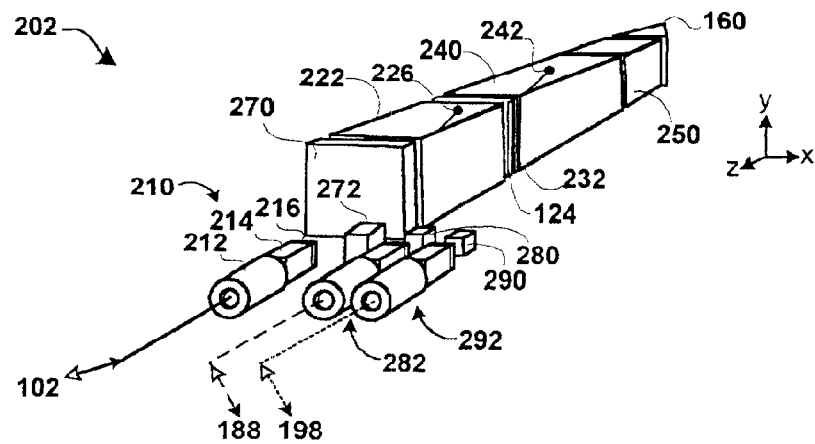

FIGS. 2A–B are isometric views of alternate embodiments of the optical mux/demux shown in FIG. 1 with birefringent crystals forming the fundamental and harmonic filters of the single filter stage. The device 200 has 3 ports 102, 188, 198 which couple with the fundamental filter cell 220 via corresponding port couplers 210, 282, 292 respectively. The port coupler 210 for port 102 includes: a lens 212, a beam splitter 214, and waveplates 216. In operation as an optical de-multiplexer an optical signal with odd and even channels modulated thereon enters lens 212 via port 102 which may be an optical fiber. The lens 212 may be a Graded Index of Refraction (GRIN) or other lens system. The lens focuses/collimates light depending on the propagation direction to/from the beam splitter 214. The beam splitter may be fabricated from a birefringent crystal with an optic axis oriented to effect a walk-off of the optical signal onto waveplates 216. The waveplates are broadband and have optical axis oriented to effect a linearization of the polarization vectors of the two rays formed by the beam splitter. The linearly polarized rays are then introduced into the fundamental filter cell which includes a fundamental filter 222 and a broadband half waveplate 124. The fundamental filter operates as a narrowband full and half or half and full waveplate for the odd and even channels respectively. The angle of the polarization vector for the linearly polarized rays with respect to the optical axis 226 of the fundamental filter cell determines the coupling of the optical signal onto the fast and slow paths, e.g. the "e" and "o" rays in the fundamental filter. The harmonic filter cell 240 optically couples with the fundamental filter cell and imposes a higher order harmonic on the optical signals processed in the fundamental filter. The angle of the polarization vector for the linearly polarized rays from the fundamental cell with respect to the optical axis 242 of the harmonic filter cell determines the coupling of the optical signal onto the fast and slow paths, e.g. the extraordinary "e" and ordinary "o" rays in the harmonic filter cell. The beam splitter/combiner 250 splits the odd and even signal outputs on the first optical processing leg from the fundamental filter cell and the harmonic filter cell. The retro reflector 160 then couples these split optical signals back into the first stage, i.e. the harmonic filter cell 240 and the fundamental filter cell where they will be further isolated. The broadband half waveplate 124 is optically coupled to the fundamental filter 222 on one of the optical processing legs to effect a substantial reduction of chromatic dispersion of the demultiplexed odd and even channels. From the fundamental filter beam benders 272, 280, 290 direct optical signals with odd channels and optical signals with even channels to a corresponding one of the two output ports 188, 198 of the demultiplexer via an associated one of the port couplers 282, 292. In operation as a multiplexer the propagation path between the ports 198, 188 and port 102 is reversed.

In the above embodiment illustrated in FIG. 2A, the optical axis 226 of the fundamental cell and optical axis 242 of the harmonic cell are oriented perpendicular to each respective cell top surface. To form an angle between the polarization direction of the incident light and the optical axis to effect polarization beam splitting, the fundamental cell or the harmonic cell may be physically rotated with respect to the signal propagation direction as indicated in FIG. 2A, especially in the case which the polarization direction of incident light is vertically or horizontally polarized. In some cases, for ease of packaging and manufacturing, it is desirable to have the fundamental cell and the harmonic cell sit flat on a packaging platform. In such a case, the birefringent crystals in the fundamental cell or the harmonic cells can be cut in such a way that their respective optical axes 226 and 242 are oriented in predetermined angles with respect to the direction of their respective top surfaces, resulting in effective polarization beam splitting. Thus, physical rotations of the fundamental or harmonic cells are not required. Alternatively, if the optical axes of 226 and 242 remain orientated perpendicular to their respective cell top surfaces, polarization rotators can be inserted in front of the fundamental cell and the harmonic cell, leading to effective polarization beam splitting as explained below in connection with FIG. 2B.

FIG. 2B shows an alternate embodiment of the optical mux/demux shown in FIG. 2A. In FIG. 2B the optical mux/demux 202 includes broadband polarization rotators 270, 232 which allow alignment of external features of the fundamental filter 222, the broadband half waveplate 124 and the harmonic filter cell 240. Polarization rotator 270 allows external features, e.g. surfaces of the fundamental filter 222 and the broadband half waveplate 124 to be aligned with the port couplers 210, 282, 292 via rotation of the optical signals entering and exiting the fundamental filter without effecting of the coupling ratio at which optical signals couple onto the fast and slow paths within the fundamental filter. Polarization rotator 232 allows external features, e.g. surfaces of the harmonic filter 240 to be aligned with the fundamental filter 222 and the broadband half waveplate 124 without effecting of the coupling ratio at which optical signals couple to/from the fast and slow paths of the fundamental filter and the harmonic filter.

Figure 3A:
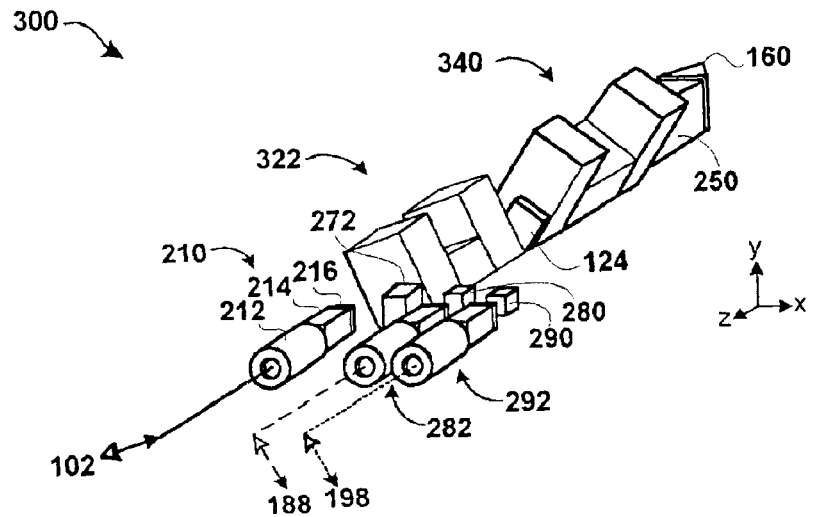
FIGS. 3A–B are isometric views of alternate embodiments of the optical mux/demux shown in FIG. 2 with optical filter cells forming the single filter stage.
Figure 3B:
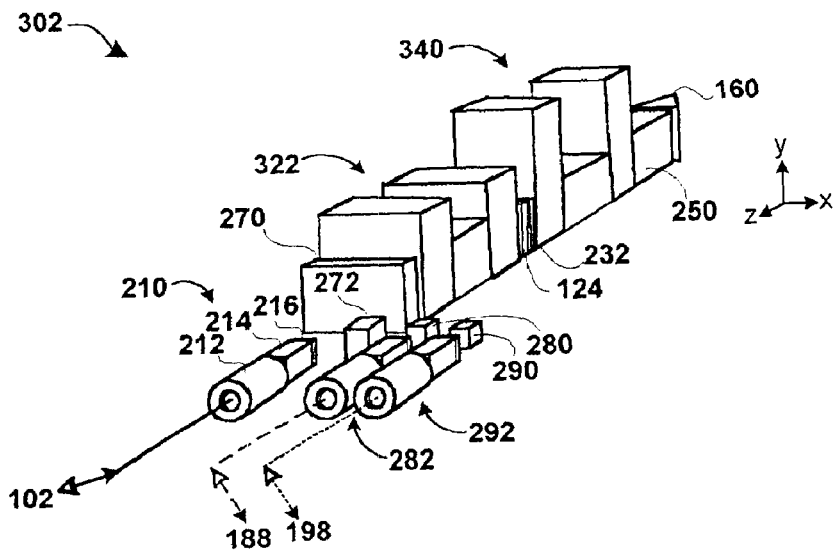

FIGS. 3A–B are isometric views of alternate embodiments 300 and 302 of the optical mux/demux shown in FIGS. 2A–B with polarization beam splitting cells 322 and 340 and broadband half waveplate 124 forming the single filter stage. These cells will be discussed in greater detail in the following FIGS. 4–6. In the embodiment shown in FIG. 3B external features of the polarization beam splitting cells 322, 340 and the broadband half waveplate 124 may be aligned with the introduction of the polarization rotators 232, 270 discussed above in connection with FIG. 2B.

Figures 4A, 4B, 4C:
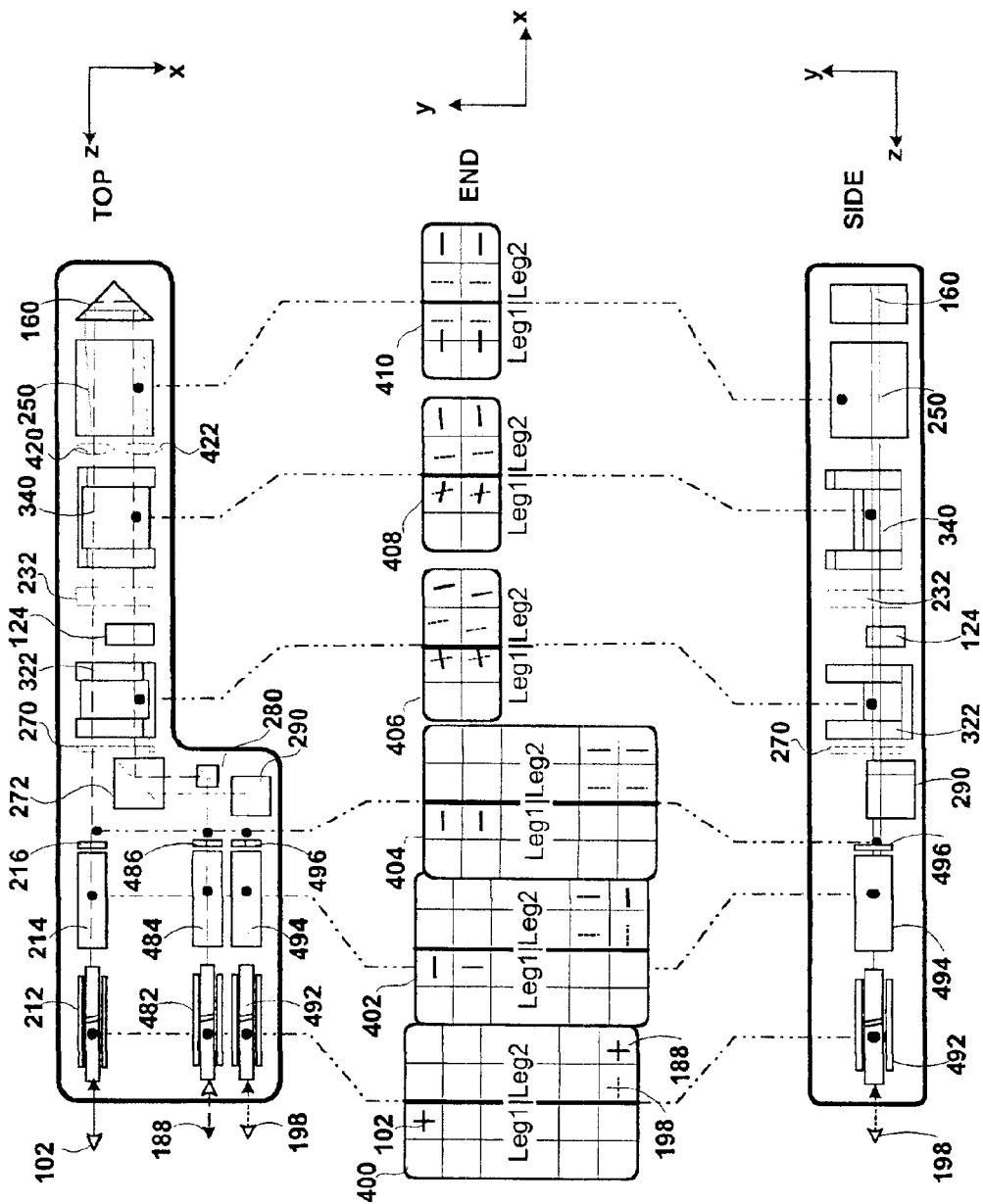
FIG. 4A and FIG. 4C are top and side hardware block views of the embodiment of the optical mux/demux shown in FIG. 3A.
FIG. 4B is a polarization diagram showing polarization vectors along the two legs of the optical processing loop formed within the embodiment of the optical mux/demux shown in FIG. 3A.

FIG. 4A and FIG. 4C are top and side hardware block views of the embodiment of the optical mux/demux shown in FIG. 3A. The polarization beam splitting cells shown in FIGS. 5–6 form the fundamental and harmonic filters of the single filter stage. The device has 3 ports 102, 188, 198 which couple with the fundamental filter cell 322 via corresponding port couplers. The port coupler for port 102 includes: lens 212, beam splitter/combiner 214, and waveplates 216. The port coupler for port 188 includes: lens 482, beam splitter/combiner 484, and waveplates 486. The port coupler for port 198 includes: lens 292, beam splitter/combiner 494, and waveplates 496. In operation as an optical de-multiplexer an optical signal with odd and even channels modulated thereon enters lens 212 via port 102 which may be an optical fiber. The lens 212 maybe a Graded Index of Refraction (GRIN) or other lens system. The lens focuses/collimates light depending on the propagation direction to/from the beam splitter/combiner 214. The beam splitter/combiner may be fabricated from a birefringent crystal with an optic axis oriented to effect a walk-off of the optical signal onto waveplates 216. The waveplates are broadband and have optical axis oriented to effect a linearization of the polarization vectors of the two rays formed by the beam splitter/combiner. The linearly polarized rays are then introduced into the fundamental filter cell which includes a polarization beam splitting cell 322 which operates as the fundamental filter and a broadband half waveplate 124. In the embodiment shown the fundamental filter operates as a narrowband full/half waveplate or half/full waveplate for the odd set of channels and the even set of channels. The angle of the polarization vector for the linearly polarized rays with respect to the polarization axis (See FIG. 5) of the fundamental filter cell determines the coupling of the optical signal onto the fast and slow paths in the fundamental filter cell. The harmonic filter cell 340 optically couples with the fundamental filter cell and imposes a higher order harmonic on the optical signals processed in the fundamental filter. The angle of the polarization vector for the linearly polarized rays from the fundamental cell with respect to the polarization axis of the harmonic filter cell determines the coupling of the optical signal onto the fast and slow paths in the harmonic filter cell. The beam splitter/combiner 250 splits the odd and even signal outputs on the first optical processing leg 420 from the fundamental filter cell and the harmonic filter cell. The retro reflector 160 then couples these split optical signals onto the second optical processing leg 422 back into the first stage, i.e. the harmonic filter cell 240 and the fundamental filter cell where they will be further isolated. The beam splitter/combiner 250 may intersect either or both of the optical processing legs 420, 422. The broadband half waveplate 124 is optically coupled to the fundamental filter 222 on one of the optical processing legs, e.g. the optical processing leg 422, to effect a substantial reduction of chromatic dispersion of the demultiplexed odd and even channels. In an alternate embodiment of the invention the broadband half waveplate may be integrated with the fundamental filter, on one of the optical processing legs 420–422. From the fundamental filter beam benders 272 directs both odd and even channel optical signal outputs to corresponding ones of beam benders 280 and 290 for redirection via the corresponding port coupler components 482–486 and 492–496 to the corresponding port 188 and 198 respectively. In operation as a multiplexer the propagation path between the ports 198, 188 and port 102 is reversed. FIGS. 4A and 4C also show in dashed lines the polarization rotators 232 and 270 which allow the alignment of external features of the port couplers, fundamental filter cell and harmonic filter as shown in FIG. 3B.

FIG. 4B is a polarization diagram showing polarization vectors along the first and second leg 420, 422 respectively of the optical processing loop formed within the embodiment of the optical mux/demux shown in FIG. 3A. The polarization diagrams are shown in views at various locations along the z axis looking in the negative z direction. Polarization diagram 400 corresponds with the polarization states within the lens 212, 482, and 492 for the polarization vectors for the optical signals entering/exiting ports 102, 188, and 198 respectively. Polarization diagram 402 corresponds with the polarization states within the beam splitter/combiners 214, 484, and 494 for the polarization vectors for the optical signals entering/exiting ports 102, 188, and 198 respectively. Polarization diagram 404 corresponds with the polarization states within the waveplates 216, 486, and 496. Polarization diagram 406 corresponds with the polarization states within the fundamental filter 320 on the first and second optical processing legs 420, 422. Polarization diagram 408 corresponds with the polarization states within the fundamental filter 340 on the first and second optical processing legs 420, 422. Polarization diagram 410 corresponds with the polarization states within the splitter/combiner 250 on the first and second optical processing legs 420, 422.

Figure 5A:
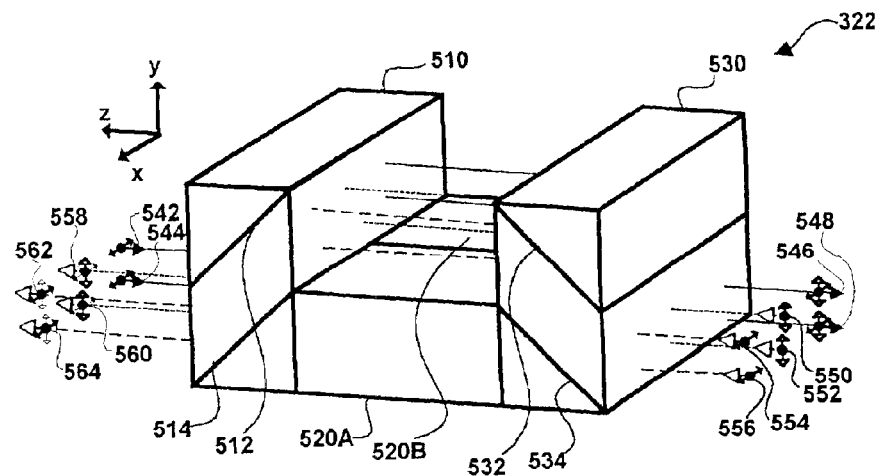
FIG. 5A is an isometric view of a polarization beam splitting cell utilized in the embodiment of the optical mux/demux shown in FIGS. 3A–B with couplers employing polarization dependent beam splitting linked by a pair of delay paths.

FIG. 5A is an isometric view of an polarization beam splitting cell utilized in the embodiment of the optical mux/demux shown in FIGS. 3A–B. The optical filter cell employs couplers with polarization dependent beam splitting to couple light onto a pair of delay paths. This polarization beam splitting cell is utilized in the embodiments of the invention shown in FIGS. 3AB and 4AB to form the fundamental filter 322 and the harmonic filters 340. The optical filter cell includes couplers employing polarization dependent beam splitting between a pair of delay paths. Each coupler transmits and reflects light depending on the input properties of the light. In the embodiment of the invention shown in FIG. 5, each coupler is polarization sensitive and includes "P" and "S" polarization axis orthogonal to one another. A first coupler is positioned in the propagation path of incoming polarized light and transmits and reflects components of incoming polarized light aligned with the "P" and "S" polarization axis of the coupler respectively. Light transmitted and reflected by the coupler follows two distinct delay paths, one for transmitted light and the other for reflected light. Where incoming is orthogonally polarized, the first coupler provides configurable amounts of coupling and cross-coupling of each of the orthogonal polarization vectors of the incoming light with either of the pair of delay paths. A second coupler positioned at a location where the two distinct delay paths intersect reverses the process and re-aligns light with orthogonal polarization vectors onto a common propagation axis.

The polarization beam splitting cell 322 is shown within an "x,y,z" Cartesian coordinate system. The cell includes opposing optical glass blocks 510, 530 displaced from one another along the z axis with the optical element(s) 520A–B covering the span between the blocks. Optical glass block 510 is shown with a reflector 512 and a polarization dependent beam splitter 514 displaced from each other in a direction defined by the y axis. Optical glass block 530 is shown with a reflector 532 and a polarization dependent beam splitter 534 displaced from each other in a direction defined by the y axis. The polarization dependent beam splitters have "S" polarization axes which are aligned, in the orientation of the cell that is shown, parallel with the x axis. The "P" polarization axis of each polarization dependent beam splitter are orthogonal to the "S" axis, i.e. aligned parallel with the y axis. Each optical glass block 510,530 maybe fabricated from two pairs of prisms. In the case of block 510 the polarization dependent beam splitter 514 may be formed from a first pair of prisms at right or other complementary angles to one another. These may be affixed to one another, e.g. cemented, to minimize wave front distortion. The hypotenuse of one of the prisms is coated with a multi layer dielectric polarizing beam splitter coating. The prisms are then affixed to one another, to form a first rectangle, the exterior surfaces of which may be antireflection coated (AR) to minimize surface reflection losses. A second pair of prisms may be used to form the reflector 512. The hypotenuse of one of this second pair of prisms is coated with a reflective dielectric coating, and cemented to the hypotenuse of the other of the second pair of prisms. The hypotenuses of this second pair of prisms are then affixed to one another as well to form a second rectangle, the exterior surfaces of which may also be AR coated. The two rectangles formed by the two pairs of prisms may then be affixed to one another to form the glass block 510. A similar technique may be used to fabricate the second block 530. Other variations on the cell are discussed in U.S. patent application Ser. No. 09/944,037 filed on Aug. 31, 2001 and entitled: "Method and Apparatus for an Optical Filter" as well as Ser. No. 09/879,026 filed on Jun. 11, 2001 and entitled: "Method and Apparatus for an Optical Filter."

In FIG. 5A the optical signals associated with the first and second legs of the optical loop are shown. Beams 542–544 are shown propagating through the filter cell along the first leg of the optical loop and exiting the filter cell as beams 546, 548 respectively. Their polarization states on entry and exit from the fundamental cell are shown in FIGS. 5D–5E respectively. Beams 550,552,554,556 are shown propagating through the filter cell in the opposite direction along the second leg of the optical loop and exiting the filter cell as beams 558,560,562 564 respectively. Their polarization states on entry and exit from the fundamental cell are shown in FIGS. 5D–5E respectively. The cell filters light bi-directionally. For purposes of illustration, polarized light is shown entering the cell in a negative direction along the z axis on the first leg of the optical processing loop and in a positive direction along the z axis on the second leg of the optical processing loop. Propagation in the opposite direction is also supported. The cell is also highly directional so that light propagating in one direction is independent of the light propagating in the reverse direction.

Figure 5B:
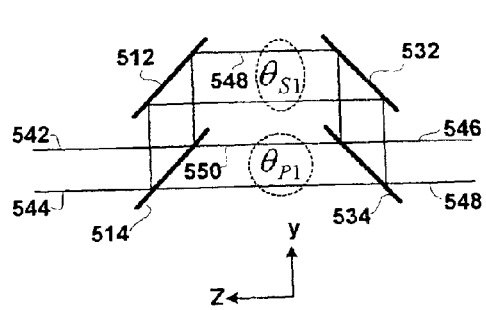
FIG. 5B shows the fast and slow delay paths within the cell shown in FIG. 5A.

FIG. 5B shows the fast and slow delay paths $\theta_{P1}$ and $\theta_{S1}$ within the polarization beam splitting cell shown in FIG. 5A. Beam 542 is split by beam splitter 514 into a pair of slow/fast delay paths 548–550. Reflectors 512, 532 reflect the optical signals on delay path 548 back to the splitter 534 where they are recombined with the optical signals on delay path 550. Similar optical processing is applied to beam 544. The amount of delay on the P and S delay paths are $\theta_{P1}$ and $\theta_{S1}$ respectively. The delay of each path is determined by its corresponding optical path length. The optical path length of each path is the sum of the product of physical dimension and the index of refraction of all the optical elements on each of the two distinct S and P delay paths 548, 550 respectively. Optical element(s) 520A–B cover the span between the blocks on the P delay paths. These optical elements have a different optical pathlength than the optical elements, solid, liquid, gas, plasma, which make up the S path. The delay difference for the cell is proportional to the difference in the optical path lengths between the P and S delay paths. The delay difference exhibits itself in the optical properties of the output beam 546. That output beam exhibits the interference pattern produced by the re-coupling of the P and S delay paths by the second of the polarization beam splitters 534 into a single output beam. The output beam includes orthogonal polarization vectors shown with a square and a circle. Each contains complementary periodic stop bands and pass bands of the other with center wavelengths the spacing between which is inversely related to the delay difference between the P and S delay paths. In other words the larger the delay difference the smaller the wavelength spacing which the optical filter cell can resolve.

Figure 5C:
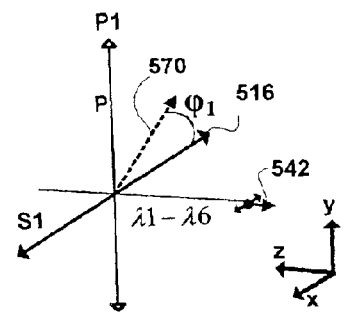
FIG. 5C is an isometric view of a linearly polarized optical signal in relation to the polarization axis of the polarization beam splitting cell shown in FIG. 5A.
Figure 5D:
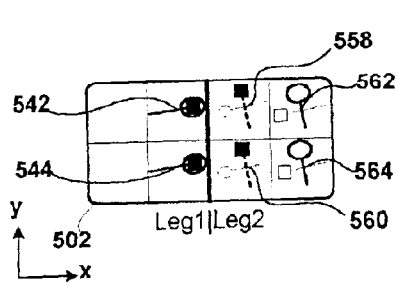
FIGS. 5D–E show polarization diagrams for opposing sides of the polarization beam splitting cell shown in FIG. 5A.
Figure 5E:
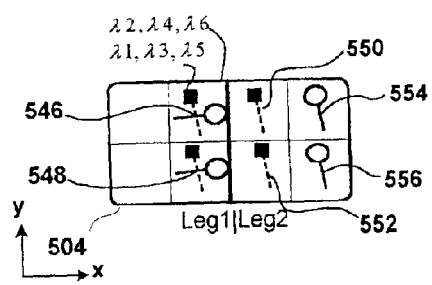

FIG. 5C is an isometric view of a linearly polarized optical signal in relation to the polarization axis of the polarization beam splitting cell shown in FIG. 5A. Polarized light from beam 542 for example, will couple with both the P and S axis of the coupler 514, a polarization beam splitter, in amounts which corresponded with the relative angular rotation between the polarization vector(s) of the polarized input and the orthogonal P and S polarization axis of the beam splitter. The component of a polarized input which projects onto the S polarization axis of the beam splitter will be reflected by the beam splitter. The component of a polarized input which projects onto the P polarization axis of the beam splitter will be transmitted by the beam splitter. The polarized light beam 542 may be arbitrarily, circularly or linearly polarized. In the example shown, beam 542 is linearly polarized with a polarization vector 570 at an angle $\phi_1$ with respect to the "S1" polarization axis 516 of the cell. As the beam 542 enters the cell it is accepted onto either of two distinct S and P delay paths 548, 550 respectively. These delay paths link the polarization dependent beam splitters 514, 534. The amount of light that is coupled onto either delay path is determined by the angle $\phi_1$ of the incoming beam vector with respect to the S polarization axis of the cell. In the example shown, light from polarization vector 570 in amounts proportionate to $\sin^2(\phi_1)$ and $\cos^2(\phi_1)$ will couple to the P and S delay paths respectively. Rotation of the cell about the propagation path, e.g. the z axis, of the beam 542 can be used to vary the coupling percentages or ratios between the incoming light and the P and S delay paths. Similar considerations apply for beams 550–556 on the second leg of the optical processing loop. Where incoming light includes orthogonal polarization vectors the coupling of either vector will be determined by projecting that vector onto the P and S polarization axis of the polarization beam splitter as well. The polarization beam splitters 514, 534 thus serve as couplers which provide configurable amounts of coupling and cross-coupling of incoming beams with either of the pair of delay paths.

FIGS. 5D–E show polarization diagrams for opposing sides of the polarization beam splitting cell shown in FIG. 5A. Polarization diagram 502 shows an embodiment of the possible polarization states for beams 542, 544 entering the filter on the first leg of the optical loop and for beams 558–562 exiting the filter from the second leg of the optical loop. Polarization diagram 504 shows representative polarization states for beams 546, 548 exiting the filter on the first leg, and for beams 552–556 entering the filter on the second leg of the optical loop. The splitter and retro reflector which form the optical loop between the first and second legs are not shown (See FIGS. 3A–B). The vector with a square at the end contains pass bands with center wavelengths at odd integer multiples of the periodic interval established by the delay difference between the delay paths in the filter. The vector with a circle at the end contains pass bands with center wavelengths at even integer multiples of the periodic interval established by the delay difference between the delay paths in the filter.

Beam 542 enters the first leg with multiplexed odd and even channels, and exits the filter with the odd and even channels de-multiplexed onto corresponding one of the two orthogonal output vectors which make up beam 546. The splitter/combiner 250 (See FIGS. 3A–B) splits these orthogonal component vectors into beams 550, 554 which are reflected by retro reflector 160 (See FIGS. 3A–B) and passed along the second leg of the optical processing leg including the portion of the second leg which intersects filter cell 322. On the second pass through the fundamental cell provided by the second leg any vestigial odd components in the even channels and even components for the odd channels are removed.

Without an offset in the FSR of the portion of the first and second legs of the optical loop which intersect the fundamental filter cell chromatic dispersion will be additive rather than complementary. Complementary chromatic dispersions on the first and second legs are desirable because they improve signal integrity. The amount of improvement in signal integrity is determined by the extent to which dispersions are at any frequency of equal and opposite sign (See FIGS. 7A–B). The offset in FSRs may be achieved by coupling the cell 322 with a broadband waveplate as shown in FIGS. 3A–B or within the polarization beam splitting cell 322 itself. In the former case the polarization beam splitting cell and a broadband half waveplate make up the fundamental filter cell. The polarization beam splitting cell is the fundamental filter portion of the fundamental filter cell and operates as a narrowband full/half or half/full waveplate for the odd and even channels respectively. The broadband waveplate completes the fundamental filter cell by coupling with the fundamental filter on one of the two legs of the optical loop and effecting phase retardations of odd integer multiples of substantially half a wavelength for each center wavelength of a corresponding channel in both the odd the odd set of channels and the even set of channels. In the latter case the fundamental filter and the broadband half waveplate are integrated with one another in a single polarization beam splitting cell. In this embodiment of the invention the optical element(s) 520A–B which cover the span between the block exhibit optical path lengths a difference of which on the first and second legs, results in the phase retardations of odd integer multiples of substantially half a wavelength for each center wavelength of a corresponding channel in both the odd the odd set of channels and the even set of channels.

In alternate embodiments of the invention other types of filters may be substituted for the birefringent or polarization beam splitting cells discussed throughout without departing from the scope of the claimed invention. For purposes of this invention a filter will be characterized as a half waveplate when it provides pairs of delay paths the relative optical difference between which corresponds to half that of the incident wavelength or odd integer multiples thereof. A filter will be characterized as a full waveplate when it provides pairs of delay paths the relative optical difference between which corresponds to that of the incident wavelength or integer multiples thereof. A filter will be characterized as narrowband when it filters odd and even channels differently, i.e. as a full waveplate for the odd channels and a half waveplate for the even channels or vice versa. A filter will be characterized as broadband when it filters odd and even channels similarly, i.e. as either a full waveplate for both the odd and even channels or as a half waveplate for both. FIG. 6A is an isometric view of a multi-cell implementation of the polarization beam splitting cell of FIG. 5A utilized in the embodiment of the optical mux/demux shown in FIG. 3A. Optical element 520 is shown as a single element spanning the P path between the two towers 510, 530. This single element presents the same optical pathlength on both the first and second leg of the optical processing loop. Two cells 322 and 340 are shown coupled serially to one another in sequence. This concept of serially coupling cells allows an optical filter to exhibit a more complex transfer function than the simple sinusoidal output provided by the single cell shown in FIG. 5A. In this example the delay paths provided by harmonic cell 340 and their delay difference are larger than the delay paths and delay difference provided by the fundamental cell 322. This result can be achieved either by fabricating cell 340 from the same optical elements as cell 322 with an increase in the physical length of the elements or by fabricating cell 340 from optical elements with higher indices of refraction than those of cell 322 thus maintaining the same form factor for both cells.

The combination of first cell and subsequent cells can be looked at as establishing by the difference between their delay paths the fundamental sinusoidal harmonic for the sequence and higher order harmonics. In an embodiment of the invention this objective is achieved by designing one of the cells in the sequence with a FSR corresponding with the desired fundamental harmonic and with others of the cells designed with FSRs which are integer fractions of the base FSR. The coefficients or amplitude of each harmonic are provided by varying the coupling ratio, percentage, coefficients between a polarized input to a cell and the P and S polarization axes of the cell as provided by the corresponding polarization beam splitter. The coupling coefficients are varied by tilting of a cell about the propagation path of a polarized input to each cell.

Cell 322 includes the components described above in connection with FIG. 5A. Between cell 322 and 340 on the second optical processing leg the broadband half waveplate 124 is shown. Cell 340 includes couplers 614, 634 employing polarization dependent beam splitting linked by a pair of delay paths 650 and 646, 648, 652. The cell 340 includes opposing optical glass blocks 610, 630 displaced from one another along the z axis with the optical element 620 covering the span between the blocks. Optical glass block 610 is shown with a reflector 612 and a polarization dependent beam splitter 614 displaced from each other in a direction defined by the y axis. Optical glass block 630 is shown with a reflector 632 and a polarization dependent beam splitter 634 displaced from each other in a direction defined by the y axis. The polarization dependent beam splitters have "S" polarization axis which are aligned with one another. Between the couplers an optical element 620 is shown. The various components are shown on top of base 606.

Only one of the beams on one of the legs of the optical processing loop is shown. That polarized beam 542 has, in the example shown, a linearly polarized input vector (See FIG. 6B). This beam enters the cell 322 where it reflected and transmitted by polarization beam splitter 514 onto one end of the pair of delay paths $\theta_{S1}$ and $\theta_{P1}$. At the opposite end of the delay paths reflection and transmission by the polarization beam splitter 534 produces a common output beam 546 which exits the cell on the first leg and proceeds directly to the harmonic cell 340, without intersecting the broadband half waveplate 124.

On entering the harmonic cell beam 546 is reflected and transmitted by polarization beam splitter 614 onto one end of the pair of delay paths $\theta_{S2}$ and $\theta_{P2}$. At the opposite end of the delay paths reflection and transmission by the polarization beam splitter 634 produces a common output beam 546N with orthogonal polarization vectors with odd and even channel components (See FIG. 6C). The process can be extended with more harmonic filters to form a more complex optical filter transfer function.

FIGS. 6B–C show polarization diagrams for opposing ends of the polarization beam splitting cells 322 and 340 shown in FIG. 6A. Polarization diagram 602 shows an embodiment of the possible polarization states for beam 542 entering the filter on the first leg of the optical loop. Polarization diagram 604 shows representative polarization states for beam 546N exiting the last filter cell 340 on the first leg or the optical processing loop. The splitter and retro reflector which form the optical loop between the first and second legs are not shown (See FIGS. 3A–B). The vector with a square at the end contains pass bands with center wavelengths at odd integer multiples of the periodic interval established by the delay difference between the delay paths in the filter. The vector with a circle at the end contains pass bands with center wavelengths at even integer multiples of the periodic interval established by the delay difference between the delay paths in the filter.

Beam 542 enters the first leg with multiplexed odd and even channels, and exits the filter with the odd and even channels de-multiplexed onto corresponding one of the two orthogonal output vectors which make up beam 546N. The splitter/combiner 250 (See FIGS. 3A–B) splits these orthogonal component vectors into beams which are reflected by retro reflector 160 (not shown, but See FIGS. 3A–B) and passed along the second leg of the optical processing leg back through cells 340, 124, and 322 in a direction opposite to the propagation direction in the first leg. On the second pass through the fundamental cell any vestigial odd components in the even channels and even components for the odd channels are removed.

Figure 6D:
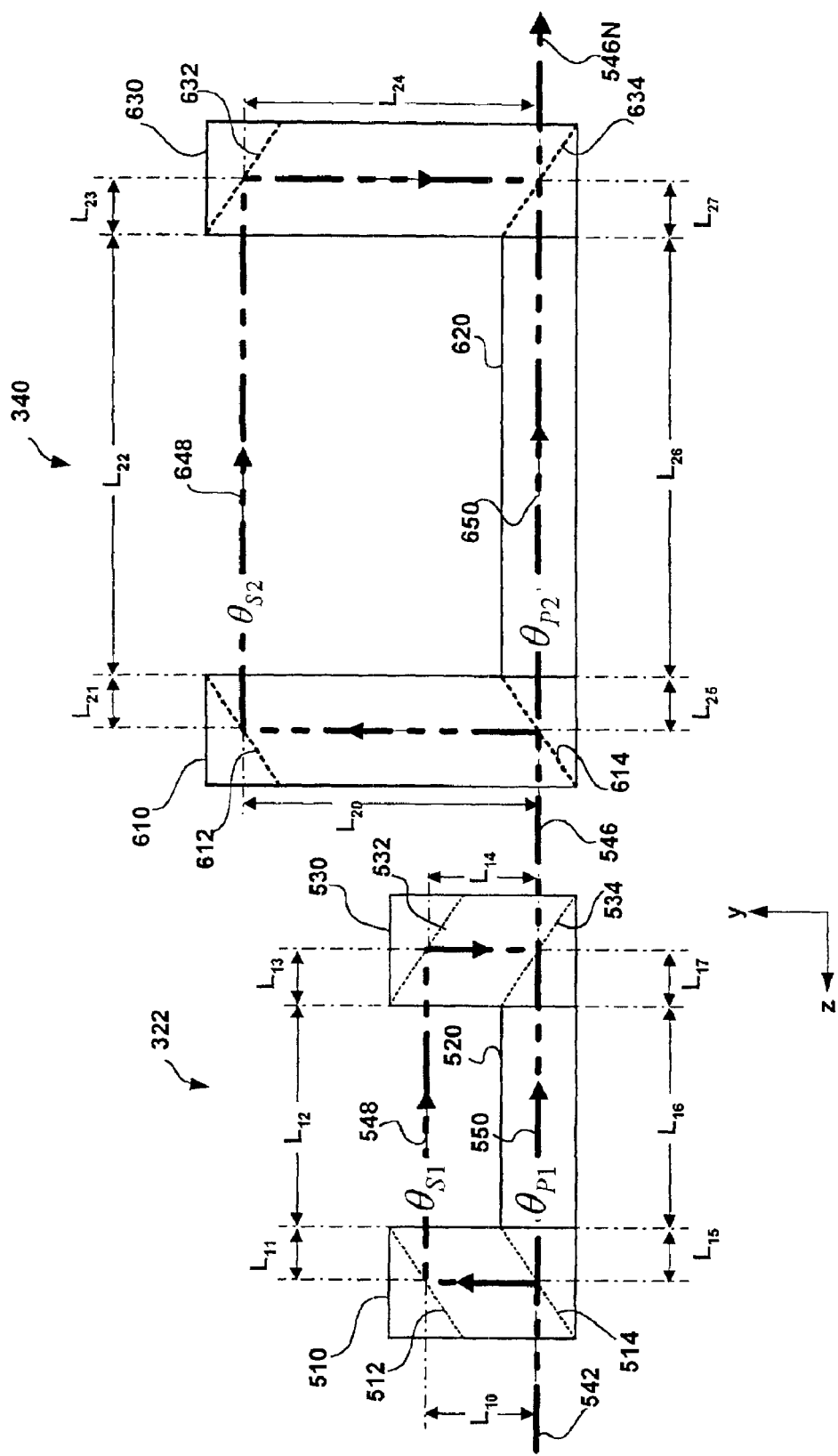
FIG. 6D is a side elevation view of the delay paths of the multi-cell implementation shown in FIG. 6A.

FIG. 6D is a side elevation view of the delay paths of the multi-cell implementation shown in FIG. 6A. The delay introduced into light passing along any delay path is a function of the optical path length of the optical elements which comprise the delay path. Optical path length "L" of an optical element is expressed as the product of the physical distance "d" traversed by a beam propagating through the element multiplied by the index of refraction "n" of the element. Where multiple optical elements are involved the individual contributions to the optical path length from the individual elements are summed. For purposes of the current invention optical elements include: a vacuum, a gas, a liquid, a solid or a plasma along the propagation path. The index of refraction of a medium identifies the ratio of the speed of light in a vacuum to that of light in the medium. Where the optical path length varies as here between two delay paths one path is said to be faster/slower than the other and there is said to be a delay difference between the two.

Beam 542 propagates through the first cell 322 across delay paths $\theta_{P1}$ and $\theta_{S1}$ and through the second cell 340 across delay paths $\theta_{P2}$ and $\theta_{S2}$. Delay path $\theta_{P1}$ comprises optical elements defined by optical path length $L_{15}$–$L_{17}$. Delay path $\theta_{S1}$ comprises optical elements defined by optical path lengths $L_{10}$–$L_{14}$. Delay path $\theta_{P2}$ comprises optical elements defined by optical path length $L_{25}$–$L_{27}$. Delay path $\theta_{S2}$ comprises optical elements defined by optical path lengths $L_{20}$–$L_{24}$. In the embodiment shown the optical elements defined by optical path lengths $L_{12}$ and $L_{22}$ include air/gas/vacuum. The remaining optical elements may be fabricated from various types of optical glass including: BKx, fused silica, SFx. By proper design of delay paths the fundamental and higher order harmonics for the optical filter may be established.

The delay for the delay paths $\theta_{P1}$ and $\theta_{S1}$ in the first filter 322 are expressed as a function of the optical path lengths of each path in the following Equations 4–5 respectively.

Equation 4:
$$\theta_{SI} = \left(2\pi \frac{v}{c}\right)\left(\sum_{i=1}^{i=I} d_i n_i\right)$$

Equation 5:
$$\theta_{PJ} = \left(2\pi \frac{v}{c}\right)\left(\sum_{j=1}^{j=J} d_j n_j\right)$$

where c and v are the frequency and velocity of light in free space and where I and J are the number of optical elements which make up the delay paths with delays $\theta_{S1}$ and $\theta_{P1}$ respectively. For each of the I optical elements: vacuum, gas, plasma, liquid or solid which make up the delay path $\theta_{S1}$ the $i^{th}$ element has a physical length $d_1$ and an index of refraction $n_i$. For each of the J optical elements: vacuum, gas, plasma, liquid or solid which make up the delay path $\theta_{P1}$ the $j^{th}$ element has a physical length $d_j$ and an index of refraction $n_j$. Optical elements include the optical coatings associated with polarization or intensity dependent beam splitters, which also contribute to optical pathlength and phase accumulations.

The delay difference between the two paths is expressed in Equation 6.

Equation 6:
$$\theta_{SI} - \theta_{PJ} = \left(2\pi \frac{v}{c}\right)\left(\sum_{i=1}^{i=I} d_i n_i - \left(\sum_{j=1}^{j=J} d_j n_j\right)\right)$$

The delay difference for the cell is proportional to the difference in the optical path lengths between the S and P delay paths. Similar considerations apply in determining the delays and delay differences for the pair of delay paths in the second cell 600.

The optical path length difference between the two delay paths in a cell, corresponds inversely with the free spectral range (FSR) generated by the cell as evidenced in the orthogonal vector components of the output beam from the cell. This relationship is set forth in the following Equation 7.

Equation 7:
$$FSR = \left(\frac{c}{|L_I - L_J|}\right) = \left(\frac{c}{\left|\sum_{i=1}^{i=I} d_i n_i - \sum_{j=1}^{j=J} d_j n_j\right|}\right) = 2\pi \frac{v}{(\theta_s - \theta_p)}$$

where $L_I$ and $L_J$ are the total optical path length of the I and J elements which make up the corresponding delay paths $\theta_{S1}$ and $\theta_{P1}$.

For an optical mux/demux the FSR should be a constant perhaps equal to the channel spacing between adjacent odd or even channels, e.g., 100 GHz. Using Equation 7 the delay difference required to generate this result can be determined, and from it a solution to the optical path lengths for each of the delay paths.

FIG. 6E is a side elevation view of the variable coupling between cells of the multi-cell implementation shown in FIG. 6A. Coupling is used to control the amount an input of polarized light that will be projected onto the S and P delay paths of a corresponding cell. Three coupling views 660, 662 and 664 are shown at appropriate locations at the input to cell 322, the interface between cells 322 and 340 and at the output of cell 340 respectively. Only one of beams 542 on one of the optical processing legs, e.g. the first optical processing leg are shown. The three views 660–664 are taken at the stated locations along the z axis looking in the positive z direction along the propagation path of the input beam 542. In the first of the coupling views 660, the polarized input is shown with a single input vector "I" and the orthogonal polarization axis P1 and S1 of the first cell 322 are shown. The input I may include orthogonal input vectors. The amount of light that is coupled onto either delay path in the first cell is determined by the angle $\phi_1$ of the incoming beam vector with the S polarization axis of the cell. In the example shown light from beam 542 will couple to the P and S delay paths in amounts proportionate with the $\sin^2(\phi_1)$ and the $\cos^2(\phi_1)$ of the angle $\phi_1$ between the vector of the beam and the P and S axis. Rotation of the cell about the propagation path of the beam 542 can be used to vary the coupling percentages or ratios between the incoming light and the P and S delay paths. In the next coupling view 662, the beam 546 from cell 322 is coupled with cell 340. The orthogonal polarization vectors $P_1,S_1$ present in the output of the fundamental cell 322 are shown along with the orthogonal polarization vectors $P_2,S_2$ which are defined by the coupler of the next cell in the sequence, i.e. harmonic cell 340. The amount of light that is coupled onto either delay path in the second cell is determined by the angle $\phi_2$ between the two sets of orthogonal vectors for beam 546 and the P and S axis of cell 340. The last coupling view 664, shows both the orthogonal polarization vectors $P_2, S_2$ present in the output of the second cell along with a second set of orthogonal polarization vectors $P_O,S_O$. This last orthogonal vector set is used to represent the beam splitter/combiner 250 (See FIG. 3A) used to separate the orthogonal vectors within the single output beam into two discrete beams (not shown). The amount of light coupled onto the output beams is defined by the angle $\phi_3$ between the two sets of orthogonal vectors.

FIG. 6F shows the individual transforms associated with each of the four delay paths on one of the two optical processing legs through the two cell sequence shown in FIG. 6A. FIG. 6F shows the individual transforms 688 associated with each of the four distinct delay paths from the input of beam 542 to the output of beam 546N. The number of discrete paths in a multi-cell sequence of N cells with two delay paths between each equals $2^N$. For two cells there are $2^2$ or 4 discrete paths between an input and an output. The first of these paths is along delay paths $\theta_{S1}$ and $\theta_{S2}$ in the first cell 322 and the second cell 340 respectively. The second of these paths is along delay paths $\theta_{S1}$ and $\theta_{P2}$. The third of these paths is along delay paths $\theta_{P1}$ and $\theta_{S2}$. The fourth of these paths is along delay paths $\theta^{P1}$ and $\theta_{P2}$. The transfer function for the optical filter in single or sequential cell embodiments is the sum of the individual transfer functions associated with each discrete path from input to output. Transfer functions: 688, 690, 692, 694 are shown for the $1^{st}$ to $4^{th}$ paths discussed above. Each transfer function includes two terms 696–698. The first term 696 corresponds to a coefficient in a Fourier series with the coefficient magnitude proportional to the product of the coupling or cross coupling coefficients along the particular path. The second term 698 corresponds to the frequency component associated with that coefficient. The frequency component corresponds with the sum of the delays along a corresponding path. This in turn corresponds with the optical path lengths along each path. The sum of all the transfer functions forms a truncated Fourier series which fully defines the optical filter.

In an embodiment of the invention in which the optical telecommunications grid includes channels spaced apart by 50 GHz a multi-cell design includes: a fundamental cell of 100 GHz FSR and a harmonic cell of 50 GHz FSR can be used to form polarization type square top comb filters. This filter can split an optical stream with 50 GHz channel spacing into two separate optical streams with odd and even 100 GHz channel spacing respectively or combining two optical stream with 100 GHz odd and even channel spacing respectively into an optical stream with 50 GHz channel spacing. The $1^{st}$ angle $\phi_1$ can substantially equal to 45 degree and 2nd angle $\phi_2$ can substantially equal to (45+15) degree. Similarly, a first cell of 100 GHz FSR and a $2^{nd}$ cell of 50 GHz FSR can be used to form an intensity type of square top comb filters. The $1^{st}$ splitting ratio equals substantially to 50/50% and the $2^{nd}$ splitting ratio equals $\cos^2(45+15°)/\sin^2(45+15°)$. In a multi-cell embodiment a square top filter function may be achieved by choosing one cell with the base FSR and with the FSRs of the remaining cells standing in relation to the FSR of the base cell as integer fractional multiples thereof.

Further teachings on sequentially coupled optical filter cells may be found in either of the two following references. See S. E. Harris et al., *Optical Network Synthesis Using Birefringent Crystals*, JOURNAL OF THE OPTICAL SOCIETY OF AMERICA, VOLUME 54, Number 10, October 1964 for a general discussion of transfer functions related to birefringent crystals. See C. H. Henry et al. U.S. Pat. No. 5,596,661 entitled "Monolithic Optical Waveguide Filters based on Fourier Expansion" issued on Jan. 21, 1997 for a general discussion of transfer functions related to wave guides.

Passive Thermal Stabilization

The typical application of optical filters constructed using the above techniques is an optical mux/demux. In order for that device to function properly it must create the desired stop bands and pass bands for the odd and even channels which it separates. For current telecommunication applications the filter would be designed with a constant FSR perhaps equal to the channel spacing, e.g., 100 GHz. An optical filter with this FSR would generate the required stop bands and pass bands in each of the orthogonal polarization vectors present on the output. One of the orthogonal output vectors would contain the pass bands associated with the center wavelengths of the odd channels. The other of the orthogonal output vectors would contain the pass bands associated with the center wavelengths of the even channels.

Temperature variations in a mux/demux that may effect the performance may result from the environment or from the power transmitted through the device. This can result in the periodic odd and even pass bands generated by the optical filter moving out of alignment with the selected grid, e.g., the ITU grid. This is primarily because the center wavelength of a pass band slips with temperature. This misalignment results in attenuation of signal strength, cross talk and ultimately loss of transmission/reception capability until the optical filter returns to its original temperature. In practice therefore, the optical filters and devices fabricated there from must be thermally stable across a range of temperatures.

One solution is to flatten the pass bands of the filter. Multi cell filter designs such as those discussed above allow the pass bands to exhibit higher order harmonics in the form of non-sinusoidal pass band profiles, a.k.a. "flat tops" (See FIG. 11). The close spacing between the channels in a WDM, makes it desirable to design a WDM with flat pass bands in order to increase the error tolerance to temperature induced shifts in the pass bands. Even with flat top filter profiles temperature stabilization is still required due to the precise telecommunication channel spacing.

One solution is to actively stabilize the temperature of the multiplexer/de-multiplexer using a heater or cooler and a closed loop feedback of temperature or wavelength. This solution can be expensive and may increase the form factor of the mux/demux. Nevertheless, the current invention may be practiced with active temperature stabilization. A possible benefit to active temperature stabilization is that the optical elements which make up each pair of delay paths may all be fabricated from a common medium with identical indices of refraction and thermal expansion coefficient.

Although capable of being utilized in systems with active temperature stabilization, the current invention is capable of providing temperature stability for the optical filters without active temperature control where appropriate. This greatly enhances the precision of the devices or systems fabricated there from and reduces system cost. The current invention is capable of providing passive temperature stabilization of an optical device, through proper selection and design of the optical elements which form each pair of delay paths so that the delay difference for each pair of delay paths and hence the system as a whole remain constant. Since the delay difference is directly related to the difference in the optical path lengths this invention provides thermal stabilization of the delay difference. In an embodiment of the invention either the birefringent or the polarization beam splitting filters may be fabricated with at least one of the delay paths with two optical elements each of which exhibits a different optical path length response to temperature. Typically this takes the form of optical elements with different thermal optic coefficients.

The system is designed so that $d(L_I-L_J)/dT$ equals substantially zero. This latter condition is satisfied when the derivative of the denominator in Equation 7 substantially equals zero as set forth in the following Equation 8:

Equation 8:

$$\frac{d(L_I - L_J)}{dT} = \frac{d\left(\sum_{i=1}^{i=I} d_i n_i - \sum_{j=1}^{j=J} d_j n_j\right)}{dT} = \sum_{i=1}^{i=I}(d_i\beta_i + \alpha_i n_i d_i) - \sum_{j=1}^{j=J}(d_j\beta_j + \alpha_j n_j d_j) \approx 0$$

where $\alpha_i$ and $\alpha_j$ are the thermal expansion coefficients for each optical element which form the S and P delay paths respectively in each cell and where $\beta_1$ and $\beta_j$ are the thermal optic coefficients for the temperature induced change in the refractive index for each element in the S and P delay paths respectively.

The following Table 1 shows various relevant optical parameters for some optical mediums which may be used to fabricate the optical elements which make up each pair of delay paths.

TABLE 1

| 1 @1550 nm | vacuum | Air | BK7 | SF5 | Fused Silica | BaK1 | LaSFN30 |
|---|---|---|---|---|---|---|---|
| 2   n | 1 | 1.00027 | 1.50066 | 1.64329 | 1.44409 | 1.55517 | 1.77448 |
| 3   $\beta = \frac{dn}{dT} \times 10^{-6}$ | 0 | 0* | 0.907465 | 1.407 | 13.7 | 0.066 | 2.293 |
| 4   $\alpha \times 10^{-6}$ | 0 | 0* | 5.1 | 8.2 | 0.52 | 7.6 | 6.2 |

*assuming constant volume

For each material its refractive index at 1550 nm is set forth in row 2 respectively. The change in refractive index n as a function of temperature $\beta$ is set forth in rows 3. Row 7 sets forth the coefficient of thermal expansion $\alpha$ for the medium. The selection of physical length of each optical components can be determined by solving Equation 4 and 5 together.

FIGS. 7A–B are graphs showing the complementary dispersion profiles about a representative center frequency of one of the channels for an optical mux/demux fabricated in accordance with the current invention. The complementary dispersion profiles result from the above discussed asymmetry in the fundamental filter between the optical pathlengths along the portions of the first and second legs of the optical loop which intersect the fundamental filter. FIG. 7A shows a representative dispersion profile where coupling of light onto fast and slow paths of either of the optical processing legs is in equal proportions. The dispersion profiles 700 and 702 for the first leg and the second leg are shown along with the substantially flat line composite dispersion 704. The flat line dispersion profile results from the broadband phase shift for the odd and even channel sets between the first and second optical processing legs in the fundamental filter cell. This phase shift of odd integer multiples of substantially half a wavelength for each center wavelength of a corresponding channel in both the odd the odd set of channels and the even set of channels causes the odd channel set and the even channel set to experience the fundamental filter cell as a full/half waveplate and a half/full waveplate on one and the other of the first and second legs of the optical loop within the fundamental filter cell. This phase shift is advantageous because it improves the signal integrity associated with multiplexing and de-multiplexing telecom communications by reducing overall chromatic dispersion in each of the channels filtered by the device.

FIG. 7B shows a representative dispersion profile where coupling of light onto fast and slow paths of either of the optical processing legs is in un-equal proportions. The dispersion profiles 710 and 714 for the first and second leg of the optical loop are shown along with the composite dispersion 716. The composite dispersion exhibits some deviation from the desired flat line response, but the tradeoff in terms of enhanced stop bands in the filter transform is appropriate for some applications as will be shown in the following FIGS. 8A–E.

Figure 8A:
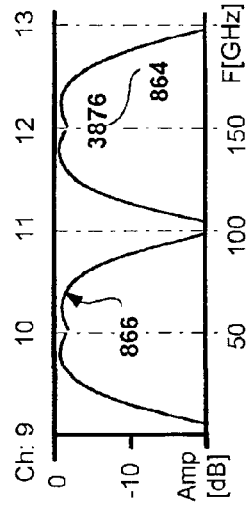
FIGS. 8A–E are signal diagrams showing filter functions at various locations along the optical path of the mux/demux shown in FIG. 1.
Figure 8B:
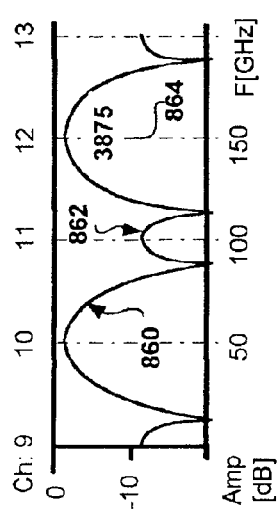

FIGS. 8A–E are signal diagrams showing filter functions at various locations along the optical path of the mux/demux shown in FIGS. 1–6. The signal diagrams shown in FIGS. 8A–B show the periodic comb filter functions to which the even channels are exposed on the first and second legs of the optical processing loop respectively. The first comb filter function to which the even channels are exposed on the first leg includes passbands for the even channels interlaced with residual components, or bleed through, of the odd channels and is shown in FIG. 8A. In the first leg, in this example the even channels are subject to a phase retardation substantially equal to the incident wavelength or integer multiples thereof. Thus there is a passband 860 for channel 10 and one for channel 12. The center frequency 864 for the passband for channel 12 coincides with a selected order of the incident wavelength, e.g., order 3875. Between the passbands for the even channels there is a bleed through of the odd passbands below the −10 dB level. The bleed through 862 for channel 11, as well as channels 9 and 13 are shown. This bleed through results from asymmetric coupling of light onto the fast and slow paths in amounts other than 50%/50%.

The coupling asymmetries in the first leg between the fast and slow paths of each filter cell are present in the second leg as shown for the even channels in FIG. 8B. Because of the wavelength shift of $\lambda/2$ or odd integer multiples thereof, in the optical pathlength difference between the portion of the first and second legs which intersect the fundamental cell, the even channels are subject to a second comb filter function different than that to which they were exposed in the first sub-stage. This second comb filter function shown in FIG. 8B includes narrow stop bands, and substantially attenuated bleed-through of the odd channels. There is a passband 866 for channel 10 and one for channel 12 with a slight dip in the flat top. The center frequency 864 for channel 12 coincides with a different selected order of the incident wavelength, e.g. order 3876 than was the case in the filter of the first sub-stage as shown in FIG. 8A.

Figure 8E:
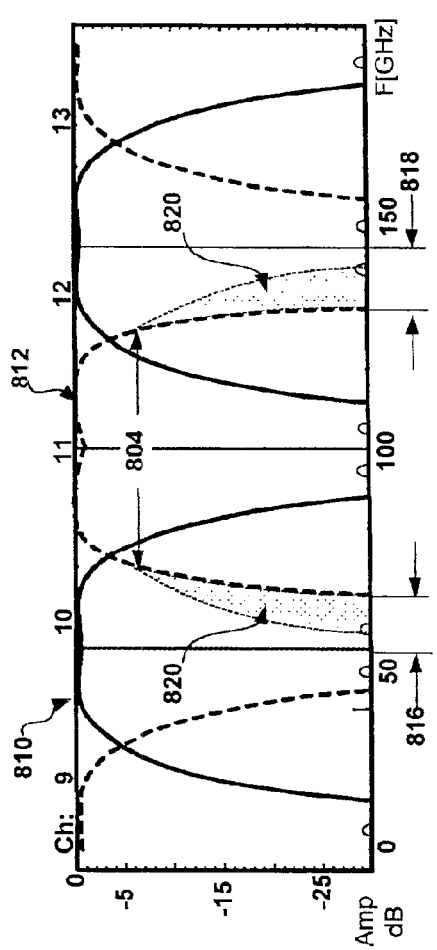
Figure 8C:
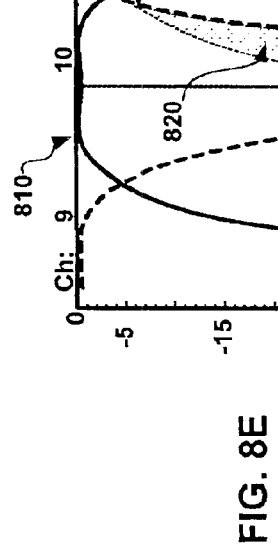
Figure 8D:
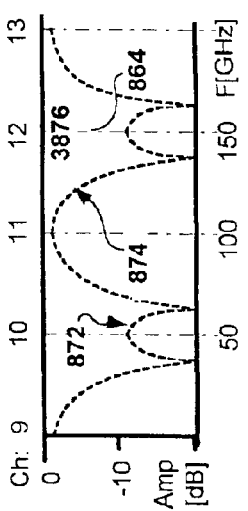

The signal diagrams shown in FIGS. 8C–D show the comb filter functions to which the odd channels are exposed on the first and second legs of the optical processing loop respectively. In the first leg, in this example the odd channels are subject to the second comb filter function with a wavelength shift of $\lambda/2$ or odd integer multiples thereof. Thus there is a passband 870 for channel 11 and one for channels 9 and 13. The center frequency 864 for the passband for channel 12 coincides with a selected order of the incident wavelength, e.g. order 3875. The filter function for the odd channels in the first sub-stage exhibits narrow stop bands, and substantially attenuated bleed-through. The coupling asymmetries in the first leg between the fast and slow paths of each filter cell are present in the second leg.

As show in FIG. 8D the wavelength shift of $\lambda/2$ in the optical pathlength difference between the portion of the first and second legs which intersects the fundamental cell results in the odd channels also being subject to a different, i.e. complementary filter function to that experienced in the first leg. The odd channels are exposed to the first comb filter function with a wavelength shift of $\lambda/2$ or odd integer multiples thereof. There is a passband 874 for channel 11 and one for channels 9,13. Between the passbands for the odd channels there is a bleed through of the even passbands below the −10 dB level. The bleed through 872 for channel 10, as well as channel 12 is shown. This bleed through results from asymmetric coupling of light onto the fast and slow paths in amounts other than 50%/50%. The same coupling ratios used in the first leg are applied in the second leg. The center frequency 864 for the passband for channel 12 coincides with a different selected order of the incident wavelength, e.g. order 3876 than was the case in the fundamental filter on the first leg as shown in FIG. 8C.

FIG. 8E shows the composite performance for the mux/demux for both the odd and even channels. The passband 810 for even channel 10 as well as for channel 12 is shown. The passband 812 for odd channel 11 as well as for channels 9,13 are shown. Each passband exhibits steep side profiles and broad stopbands when compared with prior art designs. The passband 812 for channel 11 is shown with a broad flat top 804 and with broad passbands 816–818. Superimposed on the passband 812 is a skirt 820 representative of traditional passband profiles. By comparison the current mux/demux exhibits a significant improvement in the passband profiles it generates with relatively steeper sides and broader stopbands. These improvements translate into increases in the signal integrity of the telecommunications data handled by the mux/demux.

In alternate embodiments of the invention the various filter, retro reflector and other elements of the optical device may be fabricated on a common semi-conductor substrate. The various components: reflectors, couplers, and optical elements may be fabricated using a combination of etching and deposition techniques well know in the semi-conductor industry.

The foregoing description of preferred embodiments of the invention has been presented for purposes of illustration and description. It is not intended to be exhaustive or to limit the invention to the precise forms disclosed. Obviously many modifications and variations will be apparent to practitioners skilled in this art.

What is claimed is:

1. An optical device for processing optical signals which include an odd set of channels and an even act of channels, the optical device comprising:

a fundamental filter cell for filtering optical signals propagating on a first leg and a second leg of an optical loop, wherein the first leg and the second leg of the optical loop pass through the fundamental filter cell, the fundamental filter cell operating as a full waveplate to the odd set of channels and a half waveplate to the even set of channels on the first leg of the optical loop and as a half waveplate to the odd set of channels and a full waveplate to the even set of channels on the second leg of the optical loop;

a retro reflector optically coupled with the fundamental filter cell to reflect the optical signals from the first leg to the second leg to form the optical loop through the fundamental filter cell; and a splitter/combiner optically coupled between the fundamental filter cell and the retro reflector to split or combine the odd set of channels and the even set of channels depending on the propagation direction of the optical signals along the optical loop.

2. The optical device of claim 1, where the portion of the fundamental filter intersecting the first leg of the optical loop exhibits a first free spectral range (FSR) and the portion of the fundamental filter intersecting the second leg of the optical loop exhibits a second FSR and with each of the first FSR and the second FSR substantially correspond with a channel spacing between adjacent odd or even channels.

3. The optical device of claim 2, wherein the first FSR effects phase retardations of odd integer multiples of substantially half a wavelength for each center wavelength associated with a selected one of the odd set of channels and the even set of channels and phase retardations of integer multiples of substantially a full wavelength for each center wavelength associated with a remaining one of the odd set of channels and the even act of channels; and wherein the second FSR effects complementary phase retardations in the odd set of channels and the even set of channels to those of effected by the first FSR.

4. The optical device of claim 1, wherein the fundamental filter cell further comprises:

a narrowband waveplate intersected by the first leg and the second leg of the optical loop and exhibiting a first free spectral range (FSR) substantially corresponding with a channel spacing between adjacent odd or even channels; and a broadband half waveplate optically coupled to the narrowband waveplate on one of the first leg and the second leg of the optical loop, and the broadband half waveplate exhibiting a second FSR which effects phase retardations of odd integer multiples of substantially half a wavelength for each center wavelength of a corresponding channel in both the odd the odd set of channels and the even set of channels.

5. The optical device of claim 1, further comprising:

at least one harmonic filter optically coupled to the fundamental filter cell to filter the optical signals on the first leg and the second leg of the optical loop with higher order harmonics.

6. The optical device of claim 1, further comprising:
at least one harmonic filter optically coupled to the fundamental filter cell to filter the optical signals on the first leg and the second leg of the optical loop with higher order harmonics; and
at least one optical rotator optically coupled between the at least one harmonic filter and the fundamental filter cell to rotate polarization vectors of the optical signals between the fundamental filter cell and the at least one harmonic filter to align the fundamental filter cell and the at least one harmonic filter with one another.

7. The optical device of claim 1, wherein the retro reflector further comprises:
at least one of: a corner cube and a mirror.

8. The optical device of claim 1, wherein the splitter/combiner couples between the fundamental filter cell and the retro reflector to split or combine the odd set of channels and the even set of channels on at least one of the the first leg and the second leg of tho optical loop.

9. The optical device of claim 1, wherein the fundamental filter cell further comprises:
a first pair of delay paths including a fast delay path and a slow delay path; and
polarization couplers at opposing ends of the pair or delay paths to asymmetrically split and combine light between the pair of delay paths depending on a polarization thereof.

10. The optical device of claim 1, wherein the fundamental filter cell further comprises:
a birefringent crystal having an optical axis normal to a propagation path of the optical signals, the birefringent crystal splitting and combining polarization vectors corresponding with the odd and even channels depending on a polarization direction.

11. An optical device for processing optical signals including multiplexed optical communication channels spaced apart in frequency, between a first port communicating odd channels together with even channels and second and third ports communicating odd and even channels respectively, and the optical device comprising:
a fundamental filter cell optically coupled on a side to all of the ports, and the fundamental filter cell exhibiting a first free spectral range (FSR) to optical signals propagating on a first leg of an optical loop coupled to the first port and a second FSR to the optical signals propagating on a second leg of the optical loop, the first leg coupled to the first port and the second leg coupled to the second and third ports, and with the first and second FSRs of the with respect to one another to effect substantially complimentary chromatic dispersions for each channel within the odd set of channels and the even set of channels;
a retro reflector optically coupled with the fundamental filter cell to reflect the optical signals from the first leg to the second leg or from the second leg to the first leg to form the optical loop; and
a splitter/combiner optically coupled between the fundamental filter cell and the retro reflector to split or combine the odd set of channels and the even set of channels depending on the propagation direction of the optical signals along the optical loop.

12. The optical device of claim 11, wherein the first FSR and the second FSR each substantially correspond with a channel spacing between adjacent odd or even channels.

13. The optical device of claim 11, wherein the first FSR effects phase retardations of odd integer multiples of substantially half a wavelength for each center wavelength associated with a selected one of the odd set of channels and the even set of channels and phase retardations of integer multiples of substantially a full wavelength for each center wavelength associated with a remaining one of the odd set of channels and the even set of channels; and wherein the second FSR effects complementary phase retardations in the odd set of channels and the even set of channels to those effected by the first FSR.

14. The optical device of claim 11, wherein the fundamental filter cell further comprises:
a narrowband waveplate intersected by the first leg and the second leg of the optical loop and exhibiting the first FSR; and
a broadband half waveplate optically coupled to the narrowband waveplate on one of the first leg and the second leg of the optical loop, and the broadband half waveplate exhibiting a third FSR at least an order of magnitude greater than either the first or the second FSR and the third FSR scaled to effect phase retardations of odd integer multiples of substantially half a wavelength for each center wavelength of a corresponding channel in both the odd the odd set of channels and the even set of channels.

15. The optical device of claim 11, further comprising
at least one harmonic filter exhibiting a harmonic FSR which corresponds with an integer fraction of the first FSR, and the at least one harmonic filter optically coupled to the fundamental filter cell to filter the optical signals on both legs of the optical loop with higher order harmonics.

16. The optical device of claim 11, further comprising:
at least one harmonic filter exhibiting a harmonic FSR which corresponds with an integer fraction of the first FSR, and the at least one harmonic filter optically coupled to the fundamental filter cell to filter the optical signals on the first leg and the second leg with higher order harmonics; and
at least one optical rotator optically coupled between the at least one harmonic filter and the fundamental filter cell to rotate polarization vectors of the optical signals between the fundamental filter cell and the at least one harmonic filter to align the fundamental filter cell and the at least one harmonic filter with one another.

17. The optical device of claim 11, wherein the retro reflector further comprises:
at least one of: a earner cube and a mirror.

18. The optical device of claim 11, wherein the splitter/combiner couples between the fundamental filter cell and the retro reflector to split or combine the odd set of channels and the even set of channels on at least one of the legs of the optical loop.

19. The optical device of claim 11, wherein the fundamental filter cell further comprises:
a first pair of delay paths including a fast delay path and a slow delay path; and
polarization couplers at opposing ends of the pair of delay paths to asymmetrically split and combine light between the pair of delay paths depending on a polarization thereof.

20. The optical device of claim 11, wherein the fundamental filter cell further comprises:
a birefringent crystal having an optical axis normal to a propagation path of the optical signals, the birefringent crystal splitting and combining polarization vectors corresponding with the odd and even channels depending on a polarization direction.

21. A method for splitting and combining optical signals which include an odd set of channels and an even set of channels the method comprising
- generating, on a first leg of an optical loop through a fundamental filter cell, a first set of phase retardations corresponding with odd integer multiples of half a wavelength for each center wavelength associated with a associated one of the odd set of channels and the even set of channels and corresponding with integer multiples of a full wavelength for each center wavelength associated with a remaining one of the odd set of channels and the even set of channels;
- splitting/combining the odd set of channels and the even act of channels depending on the propagation direction of the optical signals;
- generating, on a second leg of the optical loop through the fundamental filter cell, a second set of phase retardation of substantially half the wavelengths for each center wavelength associated with both the odd and even channel sets; and
- repeating, on the second leg of the optical loop through the fundamental filter cell, the first generating act to effect substantially complementary chromatic dispersions for each channel within the odd set of channels and the even set of channels.

22. A means for splitting and combining optical signals which include an odd set of channels and an even set of channels, the means comprising:
- means for generating, on a first leg or an optical loop through a fundamental filter cell, a first set of phase retardations corresponding with odd integer multiples of half a wavelength for each center wavelength associated with a selected one of the odd set of channels and the even set of channels and corresponding with integer multiples of a full wavelength for each center wavelength associated with a remaining one of the odd set of channels and the even set of channels;
- means for splitting/combinations the odd set of channels and the even set of channels depending on the propagation direction of the optical signal;
- means for generating, on a second set of the optical loop through the fundamental filter cell, a second act of phase retardations of substantially half the wavelength for each center wavelength associated with both the odd and even channel sets; and
- means for repeating, on the second leg of the optical loop through the fundamental filter cell, the first generating act to effect substantially complementary chromatic dispersions for each channel within the odd set of channels and the even set of channels.

* * * * *

UNITED STATES PATENT AND TRADEMARK OFFICE
CERTIFICATE OF CORRECTION

PATENT NO. : 6,850,364 B2
APPLICATION NO. : 10/170055
DATED : February 1, 2005
INVENTOR(S) : Xie et al.

It is certified that error appears in the above-identified patent and that said Letters Patent is hereby corrected as shown below:

Cover Page,
Item (57), under "ABSTRACT", line 21, change "an other" to --another--

Column 1,
Line 42, change "processes is reversed," to --process is reversed,--

Column 2,
Line 13, after "dispersion of" insert --a--
Line 53, before "of the two legs" change "an other" to --another--

Column 3,
Line 8, after "of the legs to" change "an other" to --another--

Column 4,
Line 25, change "dispersions profiles" to --dispersion profiles--
Line 50, after "mux/demux can" insert --,--
Line 58, after "similar or different" change "design" to --designs--

Column 5,
Line 4, after "optical signals" insert --,--
Line 5, after "even channels" insert --,--
Line 8, after "optical signals" insert --,--
Line 9, after "even channels" insert --,--

Column 6,
Line 66, after "more uniform" remove "the"

Column 7,
Line 7, change "greater then" to --greater than--
Line 14, before "via corresponding port" change "220" to --222--

Column 8,
Line 3, after "in the case" insert --in--
Line 58, change "lens 292," to --lens 492,--

Column 9,
Line 28, change "filter cell 240" to --filter cell 340--
Line 32, after "fundamental filter" change "222" to --322--

UNITED STATES PATENT AND TRADEMARK OFFICE
CERTIFICATE OF CORRECTION

PATENT NO. : 6,850,364 B2
APPLICATION NO. : 10/170055
DATED : February 1, 2005
INVENTOR(S) : Xie et al.

It is certified that error appears in the above-identified patent and that said Letters Patent is hereby corrected as shown below:

Column 10,
Line 25, after "Where incoming" insert --light--
Line 49, change "maybe fabricated" to --may be fabricated--

Column 12,
Line 58, after "by the second leg" insert --,--
Line 63, after "filter cell" insert --,--

Column 13,
Line 15, after "channel in both" remove "the odd"
Line 21, after "optical path lengths" insert --,--
Line 21, after "difference of which" insert --,--
Line 25, before "set of channels" remove "the odd"
Line 31, after "delay paths" insert --,--
Line 35, after "delay paths" insert --,--
Line 66, after "establishing" insert --,--
Line 67, after "delay paths" insert --,--

Column 14,
Line 34, change "where it reflected" to --where it is reflected--
Line 42, after "harmonic cell" insert --,--
Line 58, after "first leg" change "or" to --of--

Column 15,
Line 66, after "physical length" change "$d_1$" to --$d_i$--

Column 16,
Line 45, after "control the amount" insert --of--

Column 17,
Line 31, change "$\theta^{P1}$" to --$\theta_{P1}$--
Line 50, after "50 GHZ FSR" insert --which--
Line 55, change "optical stream" to --optical streams--
Line 57, change "45 degree" to --45 degrees--
Line 58, change "(45+15) degree." to --(45+15) degrees.--

UNITED STATES PATENT AND TRADEMARK OFFICE
CERTIFICATE OF CORRECTION

PATENT NO. : 6,850,364 B2
APPLICATION NO. : 10/170055
DATED : February 1, 2005
INVENTOR(S) : Xie et al.

It is certified that error appears in the above-identified patent and that said Letters Patent is hereby corrected as shown below:

Column 18,
Line 27, change "that may effect" to --that may affect--
Line 37, after "practice" insert --,--
Line 44, change "FIG. 11)." to --FIG. 8E).--
Line 48, before "temperature stabilization" change "profiles" to --profiles,--
Line 59, change "expansion coefficient." to --expansion coefficients.--

Column 19,
Line 54, change "in rows 3." to --in row 3.--
Line 57, change "components" to --component--
Line 57, change "Equation 4 and 5" to --Equations 4 and 5--

Column 20,
Line 9, after "channel in both" remove "the odd"
Line 52, after "in this example" insert --,--
Line 67, after "shift of $\lambda/2$" insert --,--

Column 21,
Line 15, after "in this example" insert --,--

Column 22,
Line 34, change "substantially correspond" to --substantially corresponding--
Line 43, change "the even act" to --the even set--
Line 45, after "to those" remove "of"
Line 60, after "in both the odd" remove "the odd"

Column 23,
Line 24, change "pair or delay" to --pair of delay--
Line 49, after "FSRs" change "of the" to --offset--

Column 24,
Line 23, after "both the odd" remove "the odd"
Line 46, change "a earner cube" to --a corner cube--

Column 25,
Line 3, after "channels" insert --,--
Line 8, change "associated one" to --selected one--
Line 17, change "phase retardation" to --phase retardations--

UNITED STATES PATENT AND TRADEMARK OFFICE
CERTIFICATE OF CORRECTION

PATENT NO. : 6,850,364 B2
APPLICATION NO. : 10/170055
DATED : February 1, 2005
INVENTOR(S) : Xie et al.

It is certified that error appears in the above-identified patent and that said Letters Patent is hereby corrected as shown below:

Column 26,
Line 4, after "a first leg" change "or" to --of--
Line 13, change "splitting/combinations" to --splitting/combining--
Line 15, change "optical signal;" to --optical signals;--
Line 16, change "second set" to --second leg--
Line 17, change "second act" to --second set--

Signed and Sealed this

Fifth Day of December, 2006

JON W. DUDAS
*Director of the United States Patent and Trademark Office*